US00RE42103E

(19) United States
(12) Reissued Patent
Palmer

(10) Patent Number: US RE42,103 E
(45) Date of Reissued Patent: Feb. 1, 2011

(54) APPARATUS AND METHOD OF AUTOMATICALLY ACCESSING ON-LINE SERVICES IN RESPONSE TO BROADCAST OF ON-LINE ADDRESSES

(75) Inventor: Shelton L. Palmer, New York, NY (US)

(73) Assignee: Disney Enterprises, Inc., Burbank, CA (US)

(21) Appl. No.: 09/860,259

(22) Filed: May 18, 2001

Related U.S. Patent Documents

Reissue of:
(64) Patent No.: 5,905,865
Issued: May 18, 1999
Appl. No.: 08/739,796
Filed: Oct. 30, 1996

U.S. Applications:
(60) Provisional application No. 60/008,111, filed on Oct. 30, 1995.

(51) Int. Cl.
*G06F 15/16* (2006.01)
*G06F 19/00* (2006.01)

(52) U.S. Cl. ..... 709/218; 709/202; 709/205; 709/217; 709/219; 709/227; 709/229; 725/105; 725/109; 725/112; 715/716; 707/620; 707/628

(58) Field of Classification Search ..... 709/200–205, 709/217–219, 227–228, 229, 295; 725/135–136, 725/105, 109–110, 112–113, 118; 715/716; 707/620, 628, 10, 104.1; 345/716–718, 733; 455/3.01–3.05
See application file for complete search history.

(56) References Cited

U.S. PATENT DOCUMENTS 3,947,972 A 4/1976 Freeman
4,071,697 A 1/1978 Bushnell et al.
4,078,316 A 3/1978 Freeman
4,107,735 A 8/1978 Frohbach
4,117,605 A 10/1978 Kurland et al.
4,264,924 A 4/1981 Freeman
4,264,925 A 4/1981 Freeman et al.
4,320,256 A 3/1982 Freeman
4,351,075 A 9/1982 Pittard, Jr.
4,361,851 A 11/1982 Asip et al.

(Continued)

FOREIGN PATENT DOCUMENTS

CA 1172847 8/1984

(Continued)

OTHER PUBLICATIONS

Hughes, Kevin. "Entering the World–Wide Web: A guide to Cyberspace" Mar. 1994, ACM Press, ACM SIGWEB Newsletter, vol. 3, Issue 1, pp. 4–8.*

(Continued)

*Primary Examiner*—David Lazaro
(74) *Attorney, Agent, or Firm*—Sidley Austin LLP

(57) ABSTRACT

[A m] *M*ethod*s* and [apparatus is] *systems are* provided for [connecting a] *directing* computer*s* to *communicate with a data service using* electronic addresses [in sync with an] *corresponding to* audio[/] *or* video [broadcast] *programming content. In one embodiment,* [S] *s*imultaneously with the broadcasting of audio[/] *or* video programming, an address transmitter transmits an address, such as a URL, identifying [an on-line] *a data* service, *such as a web site,* which contains information about the audio or video programming. [This] *The* address is received by a computer and used to automatically access the [on-line] *data* service. [Preferably, the process is repeated with different addresses corresponding with different programming. It is also preferred that the addresses be sent via a paging system.] *Optionally, the computer may be directed to display content of the data service.*

53 Claims, 2 Drawing Sheets

U.S. PATENT DOCUMENTS

| | | | | | |
|---|---|---|---|---|---|
| 4,372,558 | A | | 2/1983 | Shimamoto et al. | |
| 4,405,829 | A | | 9/1983 | Rivest et al. | |
| 4,451,700 | A | | 5/1984 | Kempner et al. | |
| 4,451,701 | A | | 5/1984 | Bendig | |
| 4,507,680 | A | | 3/1985 | Freeman | |
| 4,546,382 | A | | 10/1985 | McKenna et al. | |
| 4,566,030 | A | | 1/1986 | Nickerson et al. | |
| 4,567,512 | A | | 1/1986 | Abraham et al. | |
| 4,573,072 | A | | 2/1986 | Freeman | |
| 4,581,484 | A | | 4/1986 | Bendig | |
| 4,584,602 | A | | 4/1986 | Nakagawa | |
| 4,591,248 | A | | 5/1986 | Freeman | |
| 4,592,546 | A | | 6/1986 | Fascenda et al. | |
| 4,594,476 | A | | 6/1986 | Freeman | |
| 4,602,279 | A | | 7/1986 | Freeman | |
| 4,603,232 | A | | 7/1986 | Kurland et al. | |
| 4,646,145 | A | | 2/1987 | Percy et al. | |
| 4,658,290 | A | | 4/1987 | McKenna et al. | |
| 4,694,490 | A | | 9/1987 | Harvey et al. | |
| 4,706,121 | A | * | 11/1987 | Young | 348/27 |
| 4,734,858 | A | | 3/1988 | Schlafly | |
| 4,745,468 | A | | 5/1988 | Von Kohorn | |
| 4,752,954 | A | | 6/1988 | Masuko | |
| 4,792,968 | A | | 12/1988 | Katz | |
| 4,816,904 | A | | 3/1989 | McKenna et al. | |
| 4,845,739 | A | | 7/1989 | Katz | |
| 4,847,698 | A | | 7/1989 | Freeman | |
| 4,847,699 | A | | 7/1989 | Freeman | |
| 4,847,700 | A | | 7/1989 | Freeman | |
| 4,876,592 | A | | 10/1989 | Von Kohorn | |
| 4,877,408 | A | | 10/1989 | Hartsfield | |
| 4,893,248 | A | | 1/1990 | Pitts et al. | |
| 4,907,079 | A | | 3/1990 | Turner et al. | |
| 4,918,516 | A | | 4/1990 | Freeman | |
| 4,918,603 | A | | 4/1990 | Hughes et al. | |
| 4,926,255 | A | | 5/1990 | Von Kohorn | |
| 4,930,011 | A | | 5/1990 | Kiewit | |
| 4,930,150 | A | | 5/1990 | Katz | |
| 4,965,825 | A | * | 10/1990 | Harvey et al. | 380/233 |
| 4,974,254 | A | * | 11/1990 | Perine et al. | 379/100.11 |
| 4,977,455 | A | | 12/1990 | Young | |
| 4,989,233 | A | | 1/1991 | Schakowsky et al. | |
| 4,989,234 | A | | 1/1991 | Schakowsky et al. | |
| 4,998,199 | A | | 3/1991 | Tashiro et al. | |
| 5,013,038 | A | | 5/1991 | Luxenberg et al. | |
| 5,014,125 | A | | 5/1991 | Pocock et al. | |
| 5,018,736 | A | | 5/1991 | Pearson et al. | |
| 5,034,807 | A | | 7/1991 | Von Kohorn | |
| 5,035,422 | A | | 7/1991 | Berman | |
| 5,068,733 | A | | 11/1991 | Bennett | |
| 5,073,931 | A | | 12/1991 | Audebert et al. | |
| 5,083,271 | A | | 1/1992 | Thacher et al. | |
| 5,083,800 | A | | 1/1992 | Lockton | |
| 5,091,877 | A | | 2/1992 | Itoh et al. | |
| 5,093,921 | A | | 3/1992 | Bevins, Jr. | |
| 5,101,267 | A | | 3/1992 | Morales-Garza | |
| 5,120,076 | A | | 6/1992 | Luxenberg et al. | |
| 5,128,752 | A | | 7/1992 | Von Kohorn | |
| 5,140,419 | A | | 8/1992 | Galumbeck et al. | |
| 5,142,690 | A | | 8/1992 | McMullan, Jr. et al. | |
| 5,155,591 | A | | 10/1992 | Wachob | |
| 5,218,631 | A | | 6/1993 | Katz | |
| 5,223,923 | A | | 6/1993 | Morales-Garza | |
| 5,226,177 | A | | 7/1993 | Nickerson | |
| RE34,340 | E | | 8/1993 | Freeman | |
| 5,236,199 | A | | 8/1993 | Thompson, Jr. | |
| 5,251,324 | A | | 10/1993 | McMullan, Jr. | |
| 5,257,099 | A | | 10/1993 | Morales-Garza | |
| 5,262,860 | A | * | 11/1993 | Fitzpatrick et al. | 348/461 |
| 5,267,314 | A | | 11/1993 | Stambler | |
| 5,276,866 | A | | 1/1994 | Paolini | 395/200.49 |
| 5,283,734 | A | | 2/1994 | Von Kohorn | |
| 5,287,181 | A | | 2/1994 | Holman | |
| 5,311,423 | A | | 5/1994 | Clark | |
| 5,343,239 | A | | 8/1994 | Lappington et al. | |
| 5,351,075 | A | | 9/1994 | Herz et al. | |
| 5,351,285 | A | | 9/1994 | Katz | |
| 5,354,069 | A | | 10/1994 | Guttman et al. | |
| 5,363,433 | A | | 11/1994 | Isono | |
| 5,382,970 | A | | 1/1995 | Kiefi | |
| 5,410,326 | A | | 4/1995 | Goldstein | 725/38 |
| 5,423,555 | A | | 6/1995 | Kidrin | |
| 5,438,355 | A | | 8/1995 | Palmer | |
| 5,453,015 | A | | 9/1995 | Vogel | |
| 5,453,794 | A | | 9/1995 | Ezaki | |
| 5,458,494 | A | | 10/1995 | Krohn et al. | |
| 5,462,275 | A | | 10/1995 | Lowe et al. | |
| 5,479,268 | A | | 12/1995 | Young et al. | |
| 5,481,542 | A | | 1/1996 | Logston et al. | |
| 5,508,731 | A | | 4/1996 | Kohorn | |
| 5,518,253 | A | | 5/1996 | Pocock et al. | |
| 5,524,073 | A | | 6/1996 | Stambler | |
| 5,526,035 | A | | 6/1996 | Lappington et al. | |
| 5,530,469 | A | | 6/1996 | Garfinkle | |
| 5,534,913 | A | | 7/1996 | Majeti et al. | |
| 5,537,141 | A | | 7/1996 | Harper et al. | |
| 5,537,143 | A | | 7/1996 | Steingold et al. | |
| 5,538,255 | A | | 7/1996 | Barker | |
| 5,539,471 | A | | 7/1996 | Myhrvold et al. | |
| 5,543,849 | A | | 8/1996 | Long | |
| 5,547,202 | A | | 8/1996 | Tsumura | |
| 5,553,221 | A | | 9/1996 | Reimer et al. | |
| 5,555,303 | A | | 9/1996 | Stambler | |
| 5,558,339 | A | | 9/1996 | Perlman | |
| 5,564,073 | A | | 10/1996 | Takahisa | |
| 5,570,126 | A | | 10/1996 | Blahut et al. | |
| 5,570,295 | A | * | 10/1996 | Isenberg et al. | 379/90.01 |
| 5,572,442 | A | | 11/1996 | Schulhof et al. | |
| 5,572,643 | A | | 11/1996 | Judson | 395/200.48 |
| 5,585,858 | A | | 12/1996 | Harper et al. | |
| 5,586,121 | A | | 12/1996 | Moura et al. | |
| 5,589,892 | A | | 12/1996 | Knee et al. | |
| 5,612,730 | A | | 3/1997 | Lewis | |
| 5,617,565 | A | | 4/1997 | Augenbraun et al. | |
| 5,623,589 | A | | 4/1997 | Needham et al. | |
| 5,632,007 | A | | 5/1997 | Freeman | |
| 5,633,918 | A | | 5/1997 | Mankovitz | |
| 5,640,192 | A | | 6/1997 | Garfinkle | |
| 5,641,319 | A | | 6/1997 | Stoel et al. | |
| 5,643,088 | A | | 7/1997 | Vaughn et al. | |
| 5,646,998 | A | | 7/1997 | Stambler | |
| 5,649,003 | A | * | 7/1997 | Kapsales et al. | 379/88.25 |
| 5,649,284 | A | | 7/1997 | Yoshinobu | |
| 5,657,450 | A | | 8/1997 | Rao et al. | 395/200.47 |
| 5,659,366 | A | | 8/1997 | Kerman | |
| 5,668,592 | A | | 9/1997 | Spaulding, II | |
| 5,677,708 | A | | 10/1997 | Matthews, III et al. | |
| 5,679,077 | A | | 10/1997 | Pocock et al. | |
| 5,682,196 | A | | 10/1997 | Freeman | |
| 5,684,918 | A | | 11/1997 | Abecassis | |
| 5,689,799 | A | | 11/1997 | Dougherty et al. | |
| 5,694,163 | A | | 12/1997 | Harrison | |
| 5,694,334 | A | | 12/1997 | Donahue et al. | |
| 5,695,401 | A | | 12/1997 | Lowe et al. | |
| 5,696,905 | A | | 12/1997 | Reimer et al. | |
| 5,708,845 | A | | 1/1998 | Wistendahl et al. | |
| 5,721,829 | A | | 2/1998 | Dunn et al. | 395/200.49 |
| 5,724,091 | A | | 3/1998 | Freeman et al. | |
| 5,724,103 | A | | 3/1998 | Batchelor | |
| 5,729,252 | A | | 3/1998 | Fraser | |
| 5,734,413 | A | | 3/1998 | Lappington et al. | |

| | | | | | |
|---|---|---|---|---|---|
| 5,734,437 | A | | 3/1998 | Back | |
| 5,737,532 | A | | 4/1998 | DeLair et al. | 395/200.49 |
| 5,752,836 | A | | 5/1998 | Clark et al. | |
| 5,761,602 | A | | 6/1998 | Wagner et al. | |
| 5,761,606 | A | | 6/1998 | Wolzien | |
| 5,774,664 | A | | 6/1998 | Hidary et al. | |
| 5,774,666 | A | | 6/1998 | Portuesi | |
| 5,778,181 | A | | 7/1998 | Hidary et al. | |
| 5,782,692 | A | | 7/1998 | Stelovsky | |
| 5,793,302 | A | | 8/1998 | Stambler | |
| 5,794,250 | A | | 8/1998 | Carino, Jr. et al. | 707/104 |
| 5,818,441 | A | * | 10/1998 | Throckmorton et al. | 725/112 |
| 5,848,352 | A | | 12/1998 | Dougherty et al. | |
| 5,859,662 | A | | 1/1999 | Cragun et al. | |
| 5,860,862 | A | | 1/1999 | Junkin | |
| 5,861,881 | A | | 1/1999 | Freeman et al. | |
| 5,878,222 | A | * | 3/1999 | Harrison | 709/218 |
| 5,884,032 | A | | 3/1999 | Bateman et al. | |
| 5,887,243 | A | | 3/1999 | Harvey et al. | |
| 5,889,950 | A | | 3/1999 | Kuzma | |
| 5,898,919 | A | | 4/1999 | Yuen | |
| 5,905,865 | A | | 5/1999 | Palmer et al. | |
| 5,907,322 | A | | 5/1999 | Kelly et al. | |
| 5,907,715 | A | | 5/1999 | Stoel et al. | |
| 5,912,700 | A | | 6/1999 | Honey et al. | |
| 5,917,893 | A | | 6/1999 | Katz | |
| 5,931,408 | A | | 8/1999 | Ishii | |
| 5,931,908 | A | | 8/1999 | Gerba et al. | |
| 5,936,541 | A | | 8/1999 | Stambler | |
| 5,969,715 | A | | 10/1999 | Dougherty et al. | |
| 5,974,148 | A | | 10/1999 | Stambler | |
| 6,003,073 | A | | 12/1999 | Solvason | |
| 6,004,211 | A | | 12/1999 | Brenner et al. | |
| 6,006,256 | A | | 12/1999 | Zdepski et al. | |
| 6,016,344 | A | | 1/2000 | Katz | |
| 6,018,764 | A | * | 1/2000 | Field et al. | 709/217 |
| 6,018,768 | A | | 1/2000 | Ullman et al. | |
| 6,021,307 | A | | 2/2000 | Chan | |
| 6,021,433 | A | | 2/2000 | Payne et al. | |
| 6,025,837 | A | | 2/2000 | Matthews, III et al. | |
| 6,058,430 | A | | 5/2000 | Kaplan | |
| 6,061,719 | A | | 5/2000 | Bendinelli et al. | |
| 6,064,438 | A | | 5/2000 | Miller | |
| 6,067,107 | A | | 5/2000 | Travaille et al. | |
| 6,073,931 | A | | 6/2000 | Voden | |
| 6,075,527 | A | | 6/2000 | Ichihashi et al. | |
| 6,080,063 | A | | 6/2000 | Khosta | |
| 6,135,881 | A | | 10/2000 | Abbott | |
| 6,183,366 | B1 | | 2/2001 | Goldberg et al. | |
| 6,198,509 | B1 | | 3/2001 | Dougherty et al. | |
| 6,199,206 | B1 | * | 3/2001 | Nishioka et al. | 725/110 |
| 6,230,325 | B1 | * | 5/2001 | Iinuma et al. | 725/112 |
| 6,233,736 | B1 | | 5/2001 | Wolzien | |

FOREIGN PATENT DOCUMENTS

| | | | |
|---|---|---|---|
| EP | 655265 | A1 | 5/1995 |
| EP | 0673164 | A1 | 9/1995 |
| EP | 704832 | A2 | 4/1996 |
| EP | 723369 | | 7/1996 |
| EP | 0879536 | B1 | 11/1996 |
| EP | 757485 | A2 | 2/1997 |
| EP | 982943 | A2 | 3/2000 |
| GB | 1287304 | | 8/1972 |
| GB | 2057174 | A | 3/1981 |
| GB | 2120507 | A | 11/1983 |
| GB | 2161629 | A | 1/1986 |
| GB | 2207838 | A | 2/1989 |
| JP | 9102944 | | 4/1997 |
| JP | 10145687 | | 5/1998 |
| JP | 10155119 | | 6/1998 |
| JP | 10164529 | | 6/1998 |
| WO | WO-86/02753 | | 5/1986 |
| WO | WO-87/00375 | | 1/1987 |
| WO | WO-89/06405 | | 7/1989 |
| WO | WO-94/03247 | | 2/1994 |
| WO | WO9423537 | | 10/1994 |
| WO | WO-96/07270 | A1 | 3/1996 |
| WO | WO-96/13124 | | 5/1996 |
| WO | WO-97/27546 | | 7/1997 |
| WO | WO 97/27683 | | 7/1997 |
| WO | WO-97/33434 | | 9/1997 |

OTHER PUBLICATIONS

Marc Andreessen, "Using mosaic by remote control", comp. infosystems, Jun. 1993.*

Daniel G. Pouzzner, "Re: The beginning of affordable supercomputing?", comp.arch, Mar. 1994.*

WXYC representative, "WXYC's real–time internet simulcast", rec.radio.noncomm, Dec. 1994.*

"WXYC Online!", rec.radio.broadcasting or rec.radio.noncomm, Dec. 1994.*

Fred Lakin, "TV/Web Simulcast to be repeated", comp.infosystems, Jun. 1995.*

Cdurham, "Re: Overkill of graphics in a webpage", comp.infosystems, Jun. 1995.*

Tim Murphy, "Entertainment: Del Mar Thoroughbred Club", comp.infosystems, Jul. 1995.*

Ari Ollikainen, "Re: New Internet medium announced", info.ietf, Oct. 1995.*

Michaelr, "Intercast VBI data stream", rec.video.satellite.tvro, May 1996.*

John Throckmorton and Steve Batchelor, "Intercast–Enabling a Mainstream Broadcast Medium for the Personal Computer", IEEE paper, May 1996.*

Pitkow, J. & Recker, M. (1995). Using the Web as a survey tool: Results from the second WWW user survey. Journal of Computer Networks and ISDN Systems, 27(6), 809–822.

Gerfelder, Norbert; "Video Application in Multimedia Systems and Computer Networks"*SMPTE Journal;* Nov. 1996, vol. 105, No. 11 pp. 689–697.

Du, David H.C.; Lee, Yen–Jen, Ma; Wei–Hsiu; and McCahill, Mark P.; "Video–based Hypermedia for Education–On–Demand"; "*Proceedings" ACM Multimedia 96;* Boston, Massachusetts, Nov. 18–22, 1966; pp. 449–450.

Blake, Pat; "Turning On the Net"; *Telephony;* Nov. 11, 1996; pp. 34,38 & 40.

Hufftaker, Mike; "Coax"; *Telephony;* Nov. 27, 1995; pp. 44, 46,48, 50–51.

Quyyum, Hamid: "Using IVDS and VDI For Interactive Television"; *IEEE Transactions on Consumer Electronics,* vol. 42, No. 3, Aug. 1996; pp. 657–666.

Batchelor, Steve; Throckmorton, John; "Enabling a New Medium for PC–based Multimedia Systems"; *1996 Digest of Technical Papers "International Conference on Consumer Electronics",* Jun. 5–7, 1996; pp. 320–321.

Batchelor, Steve; Throckmorton, John; "Intercast–Enabling a Mainstream Broadcast Medium for the Personal Computer"; *The First Annual Conference on Emerging Technologies and Applications in Communications, "Proceedings";* IEEE Computer Society Press; Los Alamitos, California; pp. 176–177, May 7–10, 1995.

McCanne, Steven Ray.; "Scalable Compression and Transmission of Internet Multicast Video"; Computer Science Division; University of California; Berkley California; Report No. UCB/CSD–96–928; Dec. 16, 1996; pp. 1–170.

Comerford, Richard; "Interactive Media: An Internet Reality"; *IEEE Spectrum*; Apr. 1996; pp. 29–32.

Bulterman, Dick C.A.; "Embedded Video in Hypermedia Documents: Supporting Integration and Adaptive Control"; *ACM Transactions on Information Systems,* vol. 13, No. 4, Oct. 1995; pp. 440–470.

U.S. Appl. No. 597,432; filed Feb. 8, 1996; Media Online Services Access Via Address Embeded in Video or Audio Program; Inventor: Thomas R. Wolzien.

"Further Papers"; *Montreux 1995;* Jun. 13, 1995; Exhibition 9–13.

"Programme Production"; *Montreux 1995,* Jun. 13, 1995, Exhibition 9–13.

"Cable Satellite Terrestrial"; *Montreux 1995,* Jun. 13, 1995, Exhibition 9–13.

"Tagungsband"; *FKTG* (*Fernseh–und Kinotechnische Gesellschaft*); vol. 20, May 16–20, 1994.

Electronics Division; "Time Between Pictures–The Vertical Blanking Interval"; *Colloquium,* Digest No. 1994/016, Tuesday, Jan. 25, 1994.

Prof. Dr.–Ing. H. Schroder; "Multimedia: Anwendungen, Technologie, Systeme"; *ITG–Fachbericht,* Oktober . 4–6, 1995, Dortmund.

Dr.–Ing. Gangolf Hirtz; "Wide–Screen–Signalisierung"; *Fernseh–Und Kino–Technik;* 49. Jahrgang Nr. Jul.–Aug. 1995; pp. 429–437.

Dr.–Ing. Stephan Breide; "Interaktives Fernsehen" (Service on Demand); *Fernshe–Und Kino–Technik;* 49. Jahrgang Nr. Mar. 1995.

Tarrant, D.R.; "Aspects of Enhanced Teletext"; *JBC95;* Conference Publication No. 413; Sep. 14–18, 1995; Amsterdam pp. 406–411.

Kaltenborn, R.D.; and Mitchell, G.; "IBM–ITN Desktop News Service"; *IBM United Kingdom Ltd./Independent Television News, UK,* International Broadcasting Convention, Sep. 16–20, 1994; Conference Publication No. 397 pp. 509–514.

Yassini, Rouzbeh; "Cable TV's Hybrid Fiber Coax (HFC) Infrastructure for Data Communications"; *NCTA Technical Papers,* 1995–pp. 392–397.

Perry, Burt; Williams, David M.; "Rich Online Services As the Archetype For Interactive TV"; *1994 NCTA Technical Papers;* 43rd Annual NCTA Convention and Exposition, May 22–25, 1994.

"Services At Your Fingertips"; *Philips Telecommunication Review;* vol. 52, No. 4, Oct. 31, 1995.

Matsuura, Yumiko; Kinohara, Seishi; Kubozono, Ryuji, Inagaki, Michihiro; and Gomi, Kazuhiro; "Browse Search Using Audio Key–Information For Multimedia On–Demand Systems"; *IEEE Transactions On Consumer Electronics, IEEE Consumer Electronics Society;* Nov. 1996, vol. 42 No. 4 pp. 900–906.

Yanagimachi, Akio; Usui, Kazuya; Ueno, Mikihiro; Ohya, Akira; Nishizawa, Taiji; Kai, Kenjiro, and Isobe, Tadashi; "Interactivity in Braodcasting and its Application to ISDB Services"; *IEEE Transactions On Broadcasting, IEEE Broadcast Technology Society;* Sep. 1996, vol. 42, No. 3 pp. 179–186.

Usui, Kazuya; Ohya, Akira; Nishizawa, Taiji; and Kai, Kenjiro; "Multimedia Services in the HDTV Muse System"; *IEEE Transactios on Broadcasting;* Sep. 1996, vol. 42, No. 3 pp. 194–199.

Ueno, Mikihiro; Seno, Hiroshi, Kai, Kenjiro, and Isobe, Tadashi, "TV Newspapers in ISDB" "Multimedia Information Broadcasting Services"; *IEEE Transactions on Broadcasting;* Sep. 1996, vol. 42, No. 3 pp. 187–193.

Jones, Lynn; "Internet Access Via Cable TV: high Speed Access To The Information Highway"; *1995 NCTA Technical Papers;* pp. 398–413.

U.S. Appl. No. 08/735,706; filed Oct. 23, 1996; "Television Transmitter, Television Transmitting Method, Television Receiver and Television Receiving Method"; Inventors: Ota, jun; Kisanuki, Chisato; Nishioka, Hisao; and Enomoto, Takaaki.

Smith, Ian; Sawhney, Nitin "Nick"; and Balcom, David: "Hypercafe: Narrative and Aesthetic Properties of Hypervideo"; *The Georgia Institute of Technology, School of Literature, Communications, and Culture; College of Computing;* Hypertect 96, Washington DC, pp. 1–10, 1995.

Roseman, Mark and Greenberg, Saul; "Teamrooms: Network Places for Collaboration" *Dept. of Computer Science, University of Calgary.* Computer Supported Cooperative Work, 96 pp. 325–333, 1996.

Sorensen, Tryggve; Solvoll, Dag; Maartmann–Moe, Erling; Lovett, Hilde; and Bryhni, Haakon; "On–Demand Regional Television Over the Internet"; *Norwegian Computing Center;* ACM Multimedia 96; Boston, MA pp. 99–107, 1996.

Buford, John F.; "Evaluating HyTime: An Examination and Implementation Experience"; *Multimedia Systems Laboratory, Department of Computer Science, University of Massachusetts Lowell,* Hypertext 96; Washington, DC pp. 105–115, 1996.

"Carriers, Convergence & Competition"; *Telephony;* Nov. 11, 1996, vol. 231, No. 20.

European Patent Application No. 96100183.1; filed: Jan. 8, 1996; "Data Communication Method and Apparatus for Requesting and Responding to Information"; Inventor, Ando, Ichiro.

UK Patent Application No. 9701082.1; filed: Jan. 20, 1997; "Network Database System"; Inventor, Linuma, Kazumoto.

UK Patent Application No. 9620741 0; filed: Oct. 4, 1996; "Interactive radio/TV Broadcast Uses Guide Tags to Access Database"; Inventor: Sashida, Takanori and Linuma, Kazumoto.

Morganti, Michele and Fdida, Serge; "Multimedia Applications, Services and Techniques" "Lecture Notes in Computer Science"; ECMAST '97, *Second European Conference,* Milan, Italy; May 1997.

Silverman, Robert; "ESPNet SportsZone Scores Big on Web–Online sports service draws upon a number of content providers for continuous coverage"; 1995, p. 33.

"Delphi Moves HQ to New York, Adds 750 Jobs" (Delphi Internet Services will move its headquarters from Cambridge to Manhattan, and hire about 750 new employees in MA and NY), May 4, 1995.

"Wink Bridges Interactive TVS, PCS", *Multimedia Network Technology Report*; No. 24, vol. 2, Dec. 11, 1995.

Hoschka, Philipp; "Towards a Real–Time Multimedia Web"; *Birds of a Feather Session, Minutes from the 4th WWW Conference;* Boston, Dec. 12, 1995.

Kumar, Vinay; "Mbone: Interactive Multimedia on the Internet"; *New Riders,* New Riders Publishing; Indianapolis Indiana, 1996.

Vetter, Ronald J. and Jonalagada, Christopher; "A Multimedia System for Asynchronous Collaboration Using the Multicast Backbone and the World Wide Web"; *The First Annual Conference on Emerging Technologies and Applications in Communications;* Oregon Convention Center, May 7–10, 1996, IEEE Computer Society Press, Los Alamitos, CA pp. 60–63.
Mandese, Joe; "Broadcasting, meet Intercasting" Intercasting coming to PC screens", Oct. 23, 1995.
Gibbons, Kent; "Intel, Cable Eye TV, Web Bridge"; Oct. 23, 1995.
Rosenthal, Edmund; "Special To Electronic Media"; Feb. 5, 1996.
Hart, Kenneth; "Group drives Net access over TV signals"; Nov. 6, 1995.
"Intel Leads Intercast Alliance For Digitized TV Oct. 24, 1995".
"NBC, Intel, Others Hook Up to Offer TV Services via PCs"; Oct. 23, 1995.
"The Online Connection"; Dec. 26, 1995.
"New medium promises to combine television and Internet on home PC"; Dec. 1995, Broadcaster p. 13.
Hart, Kenneth; "Group drives Net access over TV signals"; Nov. 6, 1995, Communications Week International, n. 154, p. 6.
"Couches Not Required"; Oct. 23, 1995, Media Week, v 5, n. 40, p. 34+.
"Intel Links TV Thru The Net"; Oct. 30, 1995; Electronic Buyers News, p. 4.
"Three More Operators, GI Join Intercast Effort"; Feb. 26, 1996; Multichannel News, V 17, n. 9, p. 53.
Frook, John Evan; "Sony Pictures launches areas tied to TV content"; 1995.
Robertson, Jack; "Will TV Industry Grab Piece of Internet Action?"; Electronic Buyer's News, 1996, n. 991, p. 15.
"Broadcasters Guide"; *Intercast, Intel Technology;* Intel: Intercast: Viewer 2.0, 1998 Intel Corporation.
Lee Gomes, Knight–Ridder; "System puts Web pages on TVs"; *Calgary Herald*; Oct. 26, 1995, Thursday; 1995 Southam Inc.
Mandese, Joe; "Intel To Unveil PC System For Interactive TV Viewing"; *Electronic Media;* Oct. 23, 1995, Crain Communications Inc.
Dziatkiewicz, Mark; "Intercast could reel in more $ for carriers; Intel's New Interact technology"; *America's Network;* Dec. 15, 1995, vol. 99; No. 24; p. 23; Advanstar Communications Inc.
Rosenthal, Edmond; "Intercast Partners Gear Up For PC/TV Viewing"; *Electronic Media;* Feb. 5, 1996, Crain Communications Inc.
Masinter, L.; Irvine, U.C.; Fielding, R. and Berbers–Lee, T.; "Uniform Resource Identifiers (URI): Geberic Syntax"; *Network Working Group,* Aug. 1998, pp. 1–33.
"EarthWeb Releases the Most Advanced Moderated Discussion Product for the Net"; *PR Newswire;* Monday, Jun. 23, 1997.
"New Firm Develops Low–Cost Decoders For Web Transmission"; *Mobile Data Report,* Nov. 23, 1995, Information Access Company, Capital Publications, Inc. No. 23, vol. 7, ISSN: 1040–7022.
Intel: Intercast: Toold 2.0; "Installation Roadmap"; 1998 Intel Corporation, Hillsboro, Or.
Fielding, R. et al, Hypertext Transfer Protocol, Network Working Group Request for Comments: 2068, Jan. 1997.
MBone Provides Audio and Video across the Internet, taurus.cs.nps.navy.mil/pub/mbmg/mbone.html; Mar. 1993.
Hobbes' Internet Timeline, Apr. 15, 2001.
Mogul, J.; Frystyk, H.; Fielding, R.; Gettys, J. and Berners–Lee, T.; "Hypertext Transfer Protocol—HTTP/1.1"; .ics uci.edu/pub/ietf/htt/rfc2068.txt; Jan. 1997, pp. 1–134.
Macedonia, Michael R. & Brutzman, Donald P., "Mbone Provides Audio and Video Across the Internet"; taurus.cs.nps.navy.mil/pub/mbmg/mbone.html; Mar. 1993.
H'Obbes'Zakon, Robert; "Hobbes' Internet Timeline v5.3", zakon org/robert/internet/timeline/, Apr. 15, 2001.
Hock–Guan tan; "Adopting Teleview (an advanced photo–videotex system) for computer based learning activities"; cleo.murdoch.edu au/gen/aset/confs/iims/92/tanhg html, 1992 Promaco Conventions, Mar. 2000.
Wiggins, Richard; "Crawling Info Displays and Slide Shows"; webhistory.org/www/lists/www.talk.1993q3/1017.html, Mon, Sep. 27, 1993.
Burns, Ed; "Overview of Webcast"; igd fhg.de/archive/1995_www95/mbone/webcast–doc.html, Created Mar. 19, 1995, Last modified Apr. 8, 1995.
Crowcroft, Jon; "Multimedia: Video and Audio Support?"; cs.ucl.ac.uk/staff/jon/book/node153.html; Wed. May 10, 1995.
Andreessen, Marc; "Crawling Info Displays and Slide Shows"; webhistory.org/www lists/www–talk.1993q3/1018.html, Mon. Sep. 27, 1993.
Claveleira, Christian; "Les Applications de Travail Collaboratif"; cru.fr.multimedia/, Cellule Technique de CRU–03/2001, Novembre 16, 1995.
"Collabarative Document Sharing via the Mbone"; ncsa.uiuc.edu//SDG/Software/Xmosaic/CCI/webcast.html; Oct. 23, 1998.
"Overview of Webcast"; ncsa.uiuc.edu//SDG/Software/Xmosaic/CCI/webcast–doc.html; Oct. 23, 1998.
Kumar, Vinay; "An FYI: First Mbone Book Available"; sauce.uio.no/maill/mbone–1995/1776/html; Sun, Nov. 5, 1995.
Compton, Charles L. and Bosco, Paul D, "Internet CNN Newsroom A digital Video News Magazine and Library"; *1995 IEEE;* Center for Advanced Engineering Study, Electrical Engineering and Computer Science Department.
Dieberger, Andreas; "Browsing the WWW by Interacting with a Textual Virtual Environment—A Framework for Experimenting with Navigational Metaphors"; *Acm, Inc., Hypertext 96: washington DC 1996;* Georgia Institute of Technology, Schol of Literature, Communication and Culture.
Canadian Patent Database; filed on: Sep. 1, 1998; inventor, Hicks, John A. III, Application No. CA 2246023 "Internet Linkage with Broadcast TV".
"Using ClassChat"; /sabe org/samplenetclass/ChatHelp.htm; 1997 Earth Web inc.
"Earthweb Moderator"; scis.nova.edu/Orientation/moderator.html; Last modified May 17, 2001.
"Administrating a Moderator Classroom"; www/nova.edu/factrain/ How to Moderate.htm, Last Updated Apr. 30, 1998.
Byous, John; "Java™ Technology: An Early History"; java sun.com/features/1998/05/birthday.html, Feb. 8, 2001.
"Server Push–Audio?"; .../groups?hl=en&safe=off&th=26148002a40915e9,6&seekm=D7M2Gr.6rJ9s%40newsma; Google Groups: Newsgroups:comp.infosystems.www.providers, Apr. 20, 1995.

"Problems with Server Push for Audio", Google Groups. Newgroups comp.infosystems www.providers, Aug. 21, 1995.
"An Exploration of Dynamic Documents in Netscape 1.1"; home netscape com/home/demo/1.1bl/pushpull html, Apr. 12, 2001.
"Server Push with Real Audio"; Newsgroups:comp.infosystems.www.authoring.cgi; Oct. 7, 1995.
Thierry Michel; "Synchronized Multimedia"; *W3C Uner Interface Domain;* 2000 (Mar. 22, 2001).
Wiggins, Rich; "Re: Crawling Info Displays and Slide Shows"; webhistory.org/www.lists/ww–talk 1993q4/0030.html; Sun, Oct. 20, 1993.
"Technology, Tools and Applications: Remote Conference Sites"; *Third International World–Wide Web Conference.* igd.fhg.de/archive/1995_www95/mbone/remote_sites.html; Apr. 10–14, 1995, Darmstadt, Germany.
"Technology, Tools and Applications: Notes for Presentors at Multicast Sessions"; *Third International World–Wide Web Conference:* .igd.fhg.de/archive/1995_www95/mbone/remote_sites html; Apr. 10–14, 1995, Darmstadt, Germany.
Burns, Ed; "CCI for Perl:webcast 1.1a4 available"; hypernews.org/HyperNews/get/www/cciPerl/35.html; May 18, 1995.
Kumar, Vinay; proxy.belnet.be/packages.mbone/scr/www/shared–mosaic/README–Shared–Mosaic; Aug. 18, 1994.
Burns, Ed; "Webcast Man Page"; ncsa.uiuc.edu//SDG/Software/Xmosaic/CCI/webcast.3n.html, Last updated: Oct. 23, 1998.
Zawinski, Jamie; "Remote Control of UNIX Netscape"; home.netscape.com/newsref/std/x–remote.html; Dec. 1994.
Braverman, Alan; "CCI Slide Show"; ncsa.uiuc.edu//SDG/Software/Xmosaic/CI/cci–slide–show html; Sep. 22, 1994.
Andreessen, Marc; "Using Mosaic b Remote Control"; webhistory.org/www/lists/www–talk.1993q2/0447.html; Fri. Jun. 11, 1993.
"Collabarative document sharing via the Mbone"; ncsa.uiuc.edu/SDG/Software/Xmosaic/CCI/webcast html; last updated Oct. 23, 1998.
Learn_Ed Deliverable 6; "Preliminary Service Specifications (Draft)"; Dec. 31, 1995.
Learn_Ed Deliverable 9; "Service Specifications (Draft)"; titan.mic.dundee.ac.uk/projectpages/LEARNEDDels/deliverable9/Contents.htm; Dec. 31, 1996.
In the Matter of *ACTV, Inc.* v. *The Walt Disney Co.:* Deposition of Jason M. Palmer, Mar. 13, 2002.
In the Matter of *ACTV, Inc.* v. *The Walt Disney Co.:* Deposition of Shelton L. Palmer, Mar. 14, 2002.
*ACTV, Inc. and HyperTV Networks, Inc.* v. *The Walt Disney Co., ABC, Inc. and ESPN, Inc*: Civil Action No. 00 CIV 9622 (JSR) Notice of Subpoena to Jason M. Palmer, Sep. 28, 2001 (Exhibit 1 to Deposition of Jason M. Palmer, Mar. 13, 2002).
In the Matter of *ACTV, Inc.* v. *The Walt Disney Co.:* Series of notebook pages bearing Bates Nos. DR 01942–58 (Exhibit 3 to Deposition of Jason M. Palmer, Mar. 13, 2002.
*ACTV, Inc. and HyperTV Networks, Inc.*v. *The Walt Disney Co., ABC, Inc. and ESPN, Inc*: Declaration of Jason M. Palmer, Nov. 28, 2001 (Exhibit 4 to Deposition of Jason M. Palmer, Mar. 13, 2002).
*ACTV, Inc. and HyperTV Networks, Inc.*v. *The Walt Disney Co., ABC, Inc. and ESPN, Inc*: Declaration of Shelton L. Palmer, Nov. 28, 2001 (Exhibit 5 to Deposition of Jason M. Palmer, Mar. 13, 2002).
Single Sheet Bearing Bates No. DR 1959 (Exhibit 6 to Deposition of Jason M. Palmer, Mar. 13, 2002).
Document Titled: "WebPager—Automatic Access With Existing Technology", Oct. 10, 1995 (Exhibit 7 to Deposition of Jason M. Palmer, Mar. 13, 2002).
Document Titled: "WebPager Provisional Patent Modifications", Oct. 6, 1996 (Exhibit 9 to Deposition of Jason M. Palmer, Mar. 13, 2002).
*ACTV, Inc. and HyperTV Networks, Inc.* v. *The Walt Disney Co., ABC, Inc. and ESPN, Inc*: Declaration of Jason M. Palmer, Feb. 14, 2002 (Exhibit 10 to Deposition of Jason M. Palmer, Mar. 13, 2002).
Fax Transmittal Cover Sheet from Alec M. Lipkind to Shelly Palmer, May 10, 2001, and Letter from Disney Enterprises, Inc. to Shelton L. Palmer Re: Consulting Agreement and Related Patent Transaction, May 10, 2001 (Exhibit 11 to Deposition of Jason M. Palmer, Mar. 13, 2002).
Letter from Disney Enterprises, Inc. to Shelton L. Palmer Re: Consulting Agreement and Related Patent Transaction, May 10, 2001 (Exhibit 12 to Deposition of Jason M. Palmer, Mar. 13, 2002).
Agreement for Professional Services, by and between Disney Enterprises, Inc., a Delaware corporation, and SLP Productions, Inc., a New York corporation, with respect to the services of Shelton L. Palmer, Jul. 9, 2001 (Exhibit 13 to Deposition of Jason M. Palmer, Mar. 13, 2002).
The Walt Disney Company Check No. 00676752 pauable to SLP Productions, Inc. in the amount of $650,000.00, Jul. 26, 2001 (Exhibit 14 to Deposition of Jason M. Palmer, Mar. 13, 2002).
*ACTV, Inc. and HyperTV Networks, Inc.* v. *The Walt Disney Co., ABC, Inc. and ESPN, Inc*: Civil Action No. 00 CIV 9622 (JSR) Notice of Subpoena to Shelton Leigh Plamer, Sep. 28, 2001 (Exhibit 16 to Deposition of Jason M. Palmer, Mar. 13, 2002).
Document Titled: "WebPager—Automatic Access With Existing Technology", Oct. 26, 1995 (Exhibit 17 to Deposition of Jason M. Palmer, Mar. 13, 2002).
*ACTV, Inc. and HyperTV Networks, Inc.* v. *The Walt Disney Co., ABC, Inc. and ESPN, Inc*: Declaration of Shelton L. Palmer, Feb. 14, 2002 (Exhibit 18 to Deposition of Jason M. Palmer, Mar. 13, 2002).
Letter Agreement, by and among Disney Enterprises, Inc., SLP Productions, Inc. and Shelton L. Palmer, Jul. 20, 2001 (Exhibit 19 to Deposition of Jason M. Palmer, Mar. 13, 2002).
Letter Agreement, by and among Disney Enterprises, Inc., Web Pager, Inc., SLP Productions, Inc., Shelton L. Palmer and Jason M. Palmer, Jul. 20, 2001 (Exhibit 20 to Deposition of Jason M. Palmer, Mar. 13, 2002).
Authorization Letter from Webpager, Inc. to Disney Enterprises, Inc. authorizing payments to SLP Productions, Inc., Jul. 17, 2001 (Exhibit 21 to Deposition of Jason M. Palmer, Mar. 13, 2002).
*ACTV, Inc. and HyperTV Networks, Inc.* v. *The Walt Disney Co., ABC, Inc., and ESPN, Inc*: Expert Report of David B. Lockton, Jun. 11, 2001.
Interactive Network Brochure for the IN Control Unit (Exhibit A to Expert Report of David B. Lockton, Jun. 11, 2001).
Curriculum Vitae of David B. Lockton (Exhibit B to Expert Report of David B. Lockton, Jun. 11, 2001).

*ACTV, Inc. and HyperTV Networks, Inc.* v. *The Walt Disney Co., ABC, Inc., and ESPN, Inc*: Declaration of Immanuel Freedman, Nov. 28, 2001.

*ACTV, Inc. and HyperTV Networks, Inc.* v. *The Walt Disney Co., ABC, Inc., and ESPN, Inc*: Expert Report of Immanuel Freedman, Jun. 11, 2001 (Exhibit 1 of the Declaration of Immanuel Freedman, Nov. 28, 2001).

Business Wire, Inc. Business Wire Re: Formation of Industry Group to promote new digital medium for the Home PC; Intercast Medium combines the Digital Power of the PC, the Global Interactivity of the Internet and the Rich Programming of television, Monday, Oct. 23, 1995 (Exhibit K to Expert Report of Immanuel Freedman, Jun. 11, 2001).

The Second International WWW Conference 94, Mosaic and the Web, Advance Proceedings, vol. 1, Combining WWW/Mosaic with Realtime Multimedia Conferencing in Distance Education, 17 through 20 Oct. 1994 (Exhibit L to Expert Report of Immanuel Freedman, Jun. 11, 2001).

The Second International WWW Conference 94, Mosaic and the Web, Advance Proceedings, vol. 1, A Synchronous Collaboration Tool for the World–Wide Web, 17 through 20 Oct. 1994 (Exhibit M to Expert Report of Immanuel Freedman, Jun. 11, 2001).

Third Workshop on Enabling Technologies: Infrastructure for Collaborative Enterprises, Sponsored by IEEE Computer Society, with support from AAAI, In cooperation with ACM Sigois, Hosted By The Concurrent Engineering Research Center at West Virginia University, Apr. 17–19, 1994 (Exhibit N to the Expert Report of Immanuel Freedman, Jun. 11, 2001).

Exemplary Claim Chart for Claim 1 of the '181 Patent and Palmer '865 (Exhibit S to Expert Report of Immanuel Freedman, Jun. 11, 2001.

Exemplary Claim Chart for Claim 1 of the '664 Patent and Palmer '865 (Exhibit T to Expert Report of Immanuel Freedman, Jun. 11, 2001.

Exemplary Claim Chart for Claim 1 of the '181 Patent and the Dybvik Paper (Exhibit U to Expert Report of Immanuel Freedman, Jun. 11, 2001.

Document demonstrating the public availability of the software of the system disclosed in the Dybvik Paper in 1994. (Exhibit 2 to the Declaration of Immanuel Freedman, Nov. 28, 2001.

Exemplary Claim Chart for Palmer References (Exhibit 3 to Declaration of Immanuel Freedman, Nov. 28, 2001).

U.S. Appl. No. 60/008,111, filed Oct. 30, 1995, Shelton L. Palmer.

Investors Business Daily Front Page, p. A9 and other page of vol. 12 No. 137 1995, Tuesday, Oct. 24, 1995.

Document titled "Interactive Television 1996, The University of Edinburgh Sep. 3–5, 1996".

Internet Marketing Discussion list archive: Intercast Introduced, Monday, Oct. 23, 1995 i–m.com/October–22–31–1995/0017.html.

Computer Aided Technologies, The Intercaster, May 1998 vol. 1.1 narn.quiknet.com/amintercast.com/index.htm.

FAQ of The Intercast Industry Group, Jul. 10, 2001.

Interactive TV Trials, Video On Demand and Settop Trials, .teleport.com/~same/cable4.html, Apr. 23, 2001.

CNET Coverage: Intercast technology bring TV to your PC coverage.cnet.com/Content/Features/Techno/Intercast/index.html, Apr. 23, 2001.

A Synchronous Collaboration Tool for World–Wide Web Tak K. Woo, Michael J. Rees, Distributed Systems Technology Centre, The University of Queensland, Queensland 4072 ncsa.uiuc.edu/SDG/IT94/Proceedings/CSCW/rees/SynColTol.html, Apr. 12, 2001.

A Synchronous Collaboration Tool for World–Wide Web Tak K. Woo, Michael J. Rees, Distributed Systems Technology Centre, The University of Queensland, Queensland 4072, no date.

Supplier No. 19203632 Interactive television (Intercast standard) (Technology Information) Hogan, Mike; Polito, Julie; Grech, Christine; Schwerin, Rich; Schwerin, Wendin, PC Computing, v10, n4, p38(1) Apr. 1997.

PC Magazine: PC Tech, Intercast Brings the Web to TV home.zdnet.com/pcmag/pctech/content/16/02/irl602.002.html, Sep. 30, 1998.

Microsoft Digital Television: Using Analog to Deliver Digital: The VBI microsoft.com/dtv/del_art_vbioi.htm, Oct. 1, 1998.

Article Review 1: Intercast brings Web to TV opim.wharton.upenn.edu/~opim314/spring97/article1/article1/review1–leu.html, Sep. 30, 1998.

Norpak—Article 1: VBI Data Broadcasting www.vpi.ru/VBIteche.htm, Sep. 30, 1998.

Vedro info.p#ckets zno. 32, Dec. 1997 Beyond the VBI—High Speed Datacasting and Enhanced TV, By Steven Vedro cpb.org/testarea/library/infopackets/packet32.html.

Parliament of Autralia, Parliament Library Bill Digest No. 179 1997–98 Datacasting Charge (Imposition) Bill 1998 aph.gov.au/library/pubs/bd/1997–98/98bd179.htm.

The TextGrabber VBI Video Decoding System .unitec.com/textgrab.html, Sep. 30, 1998.

Intercast Industry Group Member List—Steering Committee Members .intercast.org/iig/iigsteer.htm, Sep. 30, 1998.

Intercast Industry Group Member List—Associate Members .intercast.org/iig/iigassoc.htm, Sep. 30, 1998.

Intel.com Content Producer .intel.com/intercast/developer/content/who.htm, Sep. 30, 1998.

CNET Special Reports Intercast Technology brings TV to your PC .cnet.com/Content/Features/Techno/Intercast/graphic.html, Sep. 30, 1998.

International Messaging Associates IEFT 1995 Archives Re: New Intercast medium announced mlarchive.ima.com/ietf/1995/2827.html.

Business Wire, Inc. Business Wire Re: Formation of Industry Group to promote new digital medium for the Home PC; Intercast Medium combines the Digital Power of the PC, the Global Interactivity of the Internet and the Rich Programming of television, Monday, Oct. 23, 1995.

U.S. Appl. No. 09/043,541, filed Aug. 24, 1998, Abandoned Application.

Press, Larry, "The Internet and Interactive Television." *Association for Computing Machinery. Communications of ACM,* Dec. 1993; 36, 12; ABI/Inform Global, New York, NY.

Tatsuhito Nagaya and Akio Yanagimachi. "The World's Major Multimedia–type Television Services". *Broadcasting Culture & Research,* Jan. 1998, No. 4 (Special Issue: ISDB/ISTV), Tokyo, Japan, from .nhk.or.jp/bunken/bcri–fr/h04–r13.html.

Website pages of "AirMedia Live Internet Broadcast Network", printed OCt. 7, 1996.

AirMedia Live Wireless Network Service Plans brochure, © 1996.

Website pages of "PageCard Wireless Messaging System For Windows", Socket Communications printed Oct. 24, 1996.

Walter S. Mossberos, "Personal Technology", Printed Oct. 24, 1996.

* cited by examiner

APPARATUS AND METHOD OF AUTOMATICALLY ACCESSING ON-LINE SERVICES IN RESPONSE TO BROADCAST OF ON-LINE ADDRESSES

Matter enclosed in heavy brackets [ ] appears in the original patent but forms no part of this reissue specification; matter printed in italics indicates the additions made by reissue.

This application claims benefit of provisional application Ser. No. 60/008,111 filed Oct. 30, 1995.

BACKGROUND OF THE INVENTION

Although both television programming and the Internet have undergone an explosion of content, the two have essentially expanded and developed independently. There have been relatively few successful attempts to marry these two areas of communication. Accordingly, despite the vast business opportunities afforded by television, the potential of exploiting or enhancing revenues via the Internet has been largely untapped. The same is true with respect to radio stations, which are being all but left out of the information revolution.

Although some efforts have [made to made to] *been made to* link these two areas, these efforts have suffered from disadvantages. Users can often obtain more information about their favorite programming or station by accessing a website on the World Wide Web which is dedicated to that programming. However, while the website may contain useful information which is of interest to the user, the user has to overcome a number of obstacles to get to that website. The user must first obtain an electronic address such as a Uniform Resource Locators ("URL") for the website and enter that electronic address exactly into the user's computer. These addresses are often long and complicated. These inconveniences can dissuade those who would otherwise be interested in finding programming information on the Internet.

Another manner in which broadcast programming and the Internet have been linked is allowing users to electronically communicate via the Internet with a live broadcast show. The television programming may change in response to the information being sent to the broadcaster, such as by broadcasting a transcript of the messages sent. Again, however, this method also requires the user to know and correctly use the appropriate URL.

Further, the foregoing efforts to link broadcast programming with the Internet also require that the user stay connected to one particular website. If the user wishes to find information on the Internet which is associated with different programming, they are required to change websites and undergo the same inconveniences of finding and entering the appropriate URL.

It would be advantageous, therefore, if there were a method and apparatus which saved the user the difficulty of finding and entering proper on-line electronic addresses associated with broadcast programming. There is an accompanying need for a method and apparatus which automatically connects the computer to different addresses as the programming changes.

SUMMARY OF THE INVENTION

The present invention addresses these needs.

In one preferred embodiment of the present invention, a method is provided for connecting a computer with multiple on-line services simultaneously with an audio and/or video broadcast. The method comprises the steps of providing a computer located at a first location and an on-line service located at a second location remote to the first location and broadcasting audio or video programming. Another step includes transmitting an address identifying the on-line service from an address transmitter at a third location remote from the first and second locations. The on-line service contains information corresponding with the audio or video programming being broadcast at the time the address is transmitted. Further, the step of transmitting occurs simultaneously with the step of broadcasting, and the method also includes receiving the address at the computer, such that the computer automatically accesses the on-line service by using the address information.

Preferably, the address is a Universal Resource Locator and the on-line service is an Internet Service Provider which provides access to a website. The website sends information to the computer. The address may also identify a portion of the information contained in the on-line service, with the step of connecting the computer to the on-line service occurring before the step of receiving.

The step of automatically accessing the on-line service desirably includes sending the address via a modem and telephone lines to connect the computer with the on-line service. The on-line service may count the amount of times it has been accessed by the particular computer or any computer.

It is preferred that the transmission of addresses occur via electromagnetic waves, such as over a paging system. Alternatively, the addresses may be sent from an audio or video playback device such as a VCR or the like. On the other hand, the address transmitter may be a website and the step of transmitting comprises sending the address to the computer via the Internet. Yet further, the address transmitter may be an audio/visual broadcaster, such that the address transmitter also transmits television or radio signals.

In another preferred embodiment of the invention, a method is provided for directing computers located at a plurality of different first locations to communicate with an on-line service, the on-line service being located at a second location remote from the first locations. The method includes transmitting an address identifying the on-line service from a transmitter at a third location (remote from the first and second locations) to the plurality of the computers. Another step includes broadcasting audio or video information corresponding with the address simultaneous with the step of transmitting, and simultaneously receiving the address at the plurality of computers. At least one of the computers uses the address to access the on-line service.

Preferably, the transmitting step includes transmitting the address by modulating an electromagnetic wave which has a carrier frequency associated with a television or radio signal, with the audio and/or video information being broadcast at the same carrier frequency. Alternatively, the audio and/or video information may be transmitted at a different carrier frequency. The on-line service provides information related to the audio and/or video information to the computer. The audio and/or video information may be provided to the computer before, during or after the step of accessing.

Yet another preferred embodiment of the present invention provides a method of directing computers located at a plurality of different first locations to communicate with an on-line service, the on-line service being located at a second location remote from the first locations. The method comprises: transmitting an address from a transmitter at a third location (remote to the first and second location) to the plurality of computers; simultaneously receiving the address at the plurality of computers; broadcasting audio and/or video information corresponding with the address simultaneously with the step of transmitting; using the address so that at least one of the computers accesses the on-line service; and sending information from the computer to the on-line service in response after the computer accesses the on-line service.

Desirably, the method also includes the step of modifying the audio or video information in response to the response information. More steps would include repeating the process with different addresses identifying different on-line services and then storing those different addresses in the computer. The information would then be accessed at a time after the addresses were stored.

An additional preferred embodiment provides a method of directing a computer at a first location to communicate with a first on-line service identified by a first address and a second on-line service identified by a second address. The steps include broadcasting first audio or video programming corresponding with the first on-line service simultaneously with the step of transmitting the first address; receiving the first address at the computer; transmitting the second address from the address transmitter; broadcasting second audio or video programming corresponding with the second on-line service simultaneously with the step of transmitting the second address; receiving the second address at the computer; the computer automatically accessing the first on-line service by using the first address and automatically accessing the second on-line service by using the second address.

Yet another preferred embodiment provides a method of directing a computer to access information related to radio or television programming currently being broadcast comprising transmitting an address identifying an on-line service from a paging system; receiving the address at the computer; automatically accessing the on-line service by using the address; and receiving information related to the radio or television programming.

A system in accordance with the preferred embodiment connects a computer with multiple on-line services. The system includes an audio or video programming broadcaster and a receiver for receiving different addresses identifying the on-line services, whereby the addresses are transmitted simultaneously with the programming being broadcast by the broadcaster and the on-line services contain information corresponding with the programming.

DETAILED DESCRIPTION OF THE PREFERRED EMBODIMENT

Figure 1:
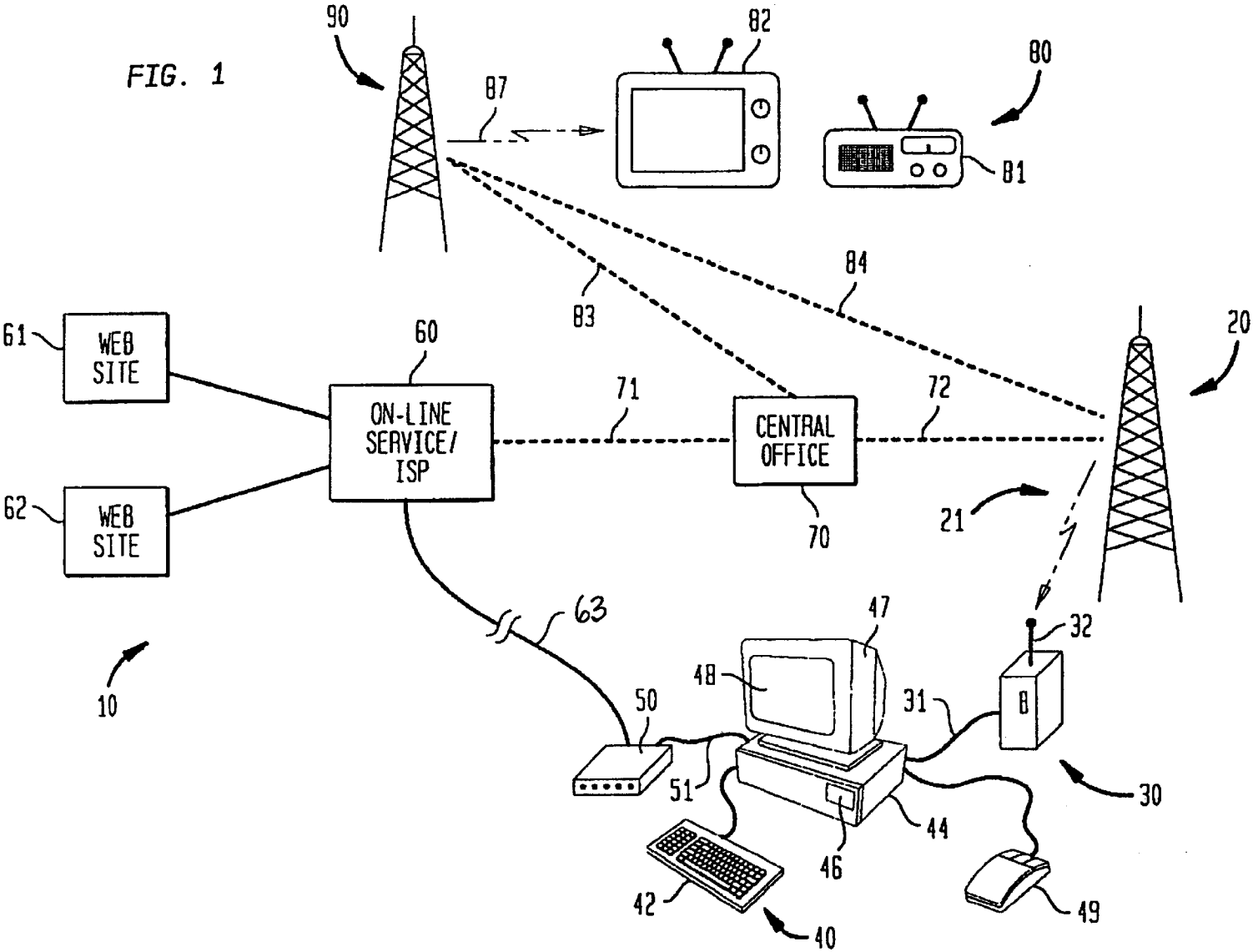
FIG. 1 is a schematic view of a system in accordance with the present invention.
Figure 2:
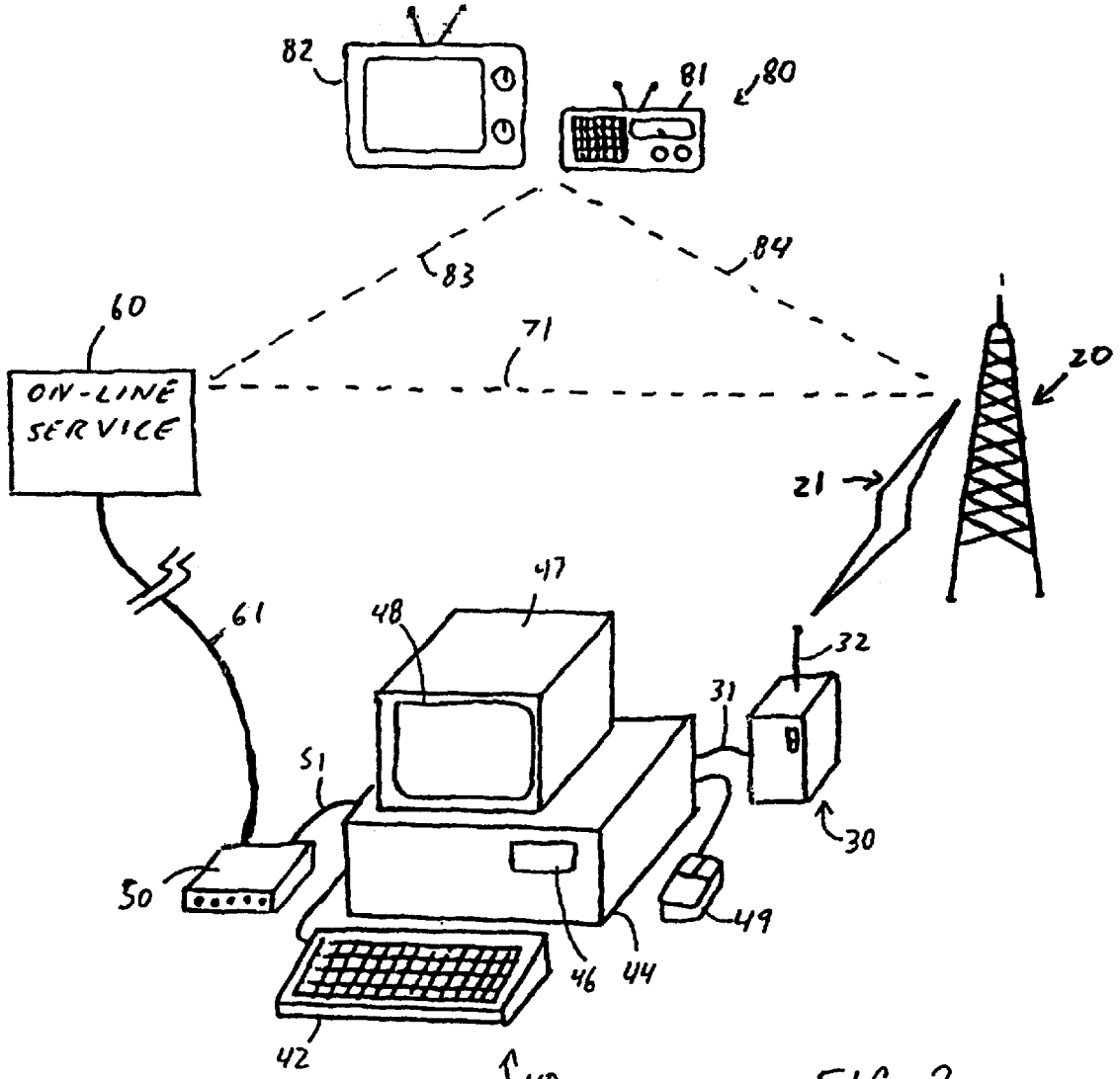
*FIG. 2 is a schematic view of a system, as shown in the provisional application.*

FIG. 1 shows a system 10 in accordance with one embodiment of the present invention. The system comprises a general computer 40, a receiver 30, an on-line service 60, a central office 70, television/radio broadcaster 90, a radio and/or television 80 and a transmitter 20.

General computer 40 includes a processor unit 44 containing a microprocessor (not shown) and a memory storage device such as hard-drive 46. A plurality of input/output peripherals are connected to the processor unit 44 including monitor 47 having a screen 48, keyboard 42, modem 50 (connected to processor unit 44 via cable 51) and mouse 49. The general computer 40 and its associated peripherals may be any of the standard personal computers currently available, such as an IBM-compatible personal computer operating under the Windows platform. In the preferred embodiment, the computer includes a program which performs the steps outlined below.

Receiver 30 is connected to processor unit 44 via cable 31. Receiver 30 is preferably an alpha-numeric pager/beeper unit, which is capable of receiving alpha-numeric information via a page. Receiver 30 includes an antenna 32 and outputs the pages it receives via cable 31 to computer 40. Pagers/beepers capable of outputting received alphanumeric messages to a computer are currently available, including the PageCard Wireless Messaging System offered by Socket Communications, Inc. of Fremont, Calif.

Modem 50 is connected to a telephone line [61] *63* as well as processor 44. The modem preferably connects with a POTS/Centrex telephone line in a manner well-known and standard to modems. The modem may alternatively be connected via ISDN, leased line, or cable modem.

An on-line service 60 is also connected to the phone network. Preferably, the on-line service is an Internet Service Provider which is capable of connecting the general computer 40 to the Internet via modem 50. The on-line service is at a physical location remote from the computer, i.e. the on-line service and computer are connected only by a communication medium such as the phone system. As used herein, the term remote means being separated by a physical distance of any length in addition to the term's ordinary meaning. The Internet Service Provider, in turn, allows Internet connections to websites/on-line services 61 and 62 which are remote from the other components of the system 10.

The system also includes two broadcasters which are located at locations remote from the other components: radio and television broadcaster 90 and paging system broadcaster 20. In manners well known in the art, radio/television broadcaster 90 broadcasts its programs via electromagnetic signals 87 to television 82 and/or radio 81. Likewise, pager broadcaster 20 broadcasts alpha-numeric pages via electromagnetic signals 21 to pagers and beepers. As is typical with such paging systems, the page can be sent on multiple frequencies and include information embedded in the signal which identifies the one or more beepers intended to receive the message.

Central office 70 maintains contact with on-line service 60 via any electronic connection 71 such as the Internet or standard telephone lines. Central office 70 maintains similar communication connections 72 and 83 with the pager and programming broadcasters 20 and 90, respectively. Preferably, the central office is another website. Central office 70 is used to help coordinate the various activities of the components of the system. However, as many of these activities may be planned in advance as shown below, central office 70 is not necessary to implementation of the invention.

In operation, paging system tower 20 broadcasts a page intended for reception by receiver 30. The request for the page may have originated from either the central office 70 or from the radio/television broadcaster 90, with the page request being sent by telephone lines. The receiver 30 receives the transmitted paged message and outputs the message to the processor 44 via cable 31.

The general computer handles the page in accordance with the dictates of the program. The program continuously monitors and/or polls receiver 30 to determine whether any pages have been received, such as by monitoring the processor's COM port connected to receiver 30 via wire 31. When a page has been detected as received, the program tests the page to determine whether it includes a valid URL. By way of example, a valid URL might be "http://www.palmer.net" which is the URL for website 61. If the message is a valid URL, the program stores the URL in memory such as by writing it onto hard drive 46.

The processor 44 next causes modem 50 to connect computer 40 with the Internet Service Provider 60 (if not already connected) via telephone line [61] *63*. Using functions typically present in a web browser, the program then sends the stored URL to the Internet Service Provider 60 which in turn allows the computer 40 to receive information from and interact with the website associated with the URL. The information received from website 61 will be displayed on screen 48. The program repeats the process each time a new and different URL is received by receiver 30, such as when the URL for website 62 is transmitted. Alternatively, the next URL may be another webpage of the current website 61. Accordingly, it is preferable for the program to be a World Wide Web compatible browser (Mosaic, Netscape or Microsoft Internet Explorer) with the remaining aspects of receiving and testing incoming URL's being a TSR (Temporary Stay Resident), DLL (Dynamic Link Library) or "plug-in", i.e., specific software code useable by a web browser.

In the preferred embodiment, the URL's are broadcast over the paging system to correspond with the programming broadcasted for radio or televisions. For example, every time a commercial is shown on television 82, a URL associated with that advertiser's website is simultaneously sent from tower 20 to receiver 30. That website may be the advertiser's home page. The tower 20 then sends out the address of a different website when the next commercial begins. Thus, computer screen 48 displays different information from different websites to simultaneously correspond with television or radio programming. The computer connects with the different websites automatically and in [relatively synchronously] *relative synchronicity* with the broadcast signals. The broadcaster, in effect, controls the Internet destination of the user's computer. This turns the receiver's computer into a directed video kiosk controlled and programmed by the television or radio broadcasters. As paging and phone systems are essentially ubiquitous, there is essentially no geographical limit to the invention. Although the sending and receiving of audio/visual information and URL's should be simultaneous, the URL actually may be accessed during or after the audio/video signal.

Central office 70 coordinates the activities between paging system 20 and programming broadcaster 90. The radio and television stations may provide the central office with a schedule of programming and the associated URL's. In accordance with those schedules, the central office sends page requests to the paging system via the telephone lines or Internet at predetermined times. For any radio and television programming where it is difficult to predict when the [ULR's] *URL's* should be simulcast with the broadcast programming, such as live broadcasts, the station 90 may send its URL page requests either to central office 70 or directly to paging system 20 (as referenced by line 84 of FIG. 1) in relative synchronicity and real-time with the programming. Yet further, the station may inform the central office of what URL's should be paged by embedding the information right in its broadcast. For example, the URL may be embedded in the vertical blanking interval, sideband or alternative band or channel of the broadcast and extracted by the central office 70.

In another preferred embodiment, the URL messages are not broadcast via a paging system but are instead sent over the Internet. For instance, the computer 40 uses a first web browser to connect with central office 70 over the Internet, and receives a steady stream of URL locations from central office 70. These locations are provided to a second web browser running on computer 40 which connects with different websites as noted above. Thus, by running the first web browser connected to the central office in the background or "minimized", the second web browser will continuously update the screen with changing information.

The present invention allows a wide variety of other options which increases its versatility to meet a user's particular needs. For example, the user can run the program in two modes, namely "auto-pilot" and "history-stack". In the auto-pilot mode, the computer automatically connects to a website the moment the website's URL is received by receiver 30, as explained above. In history-stack mode, on the other hand, the computer does not immediately connect to a website upon receipt of a URL. Rather, the URL's are stacked on hard drive 46 to be used at a later time and order chosen by the user. In order to access any of the websites, the user need do no more than select one of the URL's which have been stored in memory. The user does not have to enter any electronic addresses. To fully bring out the value of history-stack mode, it is recommended to add information to the transmitted URL messages, i.e. an English description of the URL. For example, the transmitted message might be "http://www.palmer.net Palmer Computer Services, Inc. Home Page", where the first portion of the message is the URL used by the web browser and the second portion of the message is displayed by the program so the user can understand what the website is about.

While in auto-pilot mode, the program allows the user to interrupt the automatic connection to websites by clicking anywhere in a given web page or by pressing a key on the keyboard or other applicable user controlled input device. When the user opts out of auto-pilot mode, the program automatically switches to history-stack mode so that the user can return to the websites which were missed while reviewing the paused website. The user may switch back to auto-pilot mode at any time.

The program can also be configured to automatically switch between auto-pilot and history-stack modes upon the occurrence of predetermined events such as expiration of timers or connection to specific websites. For example, the program may switch from auto-pilot mode to history-stack mode and wait for a user response when the program detects certain information, such as connection to a website offering a contest entry form.

The invention is uniquely suited to capitalize on and add value to traditional broadcasts by manipulating Internet connections. Advertising is enhanced by making more complete information and options available to potential buyers. By way of example, the system can promote direct response selling such as taking users to specific web sites in sync with radio broadcasts. While a song is playing on the radio, the computer may simultaneously connect to a website which allows the user to immediately order the artist's CD. Thus, the user can order a product over the Internet with relatively minimal effort and without knowing or typing any specific electronic addresses. The website (or page) changes when the song changes, offering yet another selling opportunity. Alternatively, potential buyers may be directed to on-line chat areas to ask live salespeople questions about the products being transmitted over the broadcast. Further, where technology permits, an Internet telephone call can be created between the user and the content provider.

A variety of other sales opportunities are also presented. Options include making coupons available to users in sync with commercials. Special-offer and limited-time sales are also possible by offering discounts and incentives to those customers who quickly respond to a commercial via Internet. Contest entries are similarly available. The broadcast may also be modified in response to the information received, such as by announcing contest winners or number of purchasers.

The invention may also be used to add an additional dimension to traditional broadcast programming. Text, graphics, movies and other computerized information can automatically be sent to user's computers while they are watching a program. For example, a radio broadcast may be supplemented by transmitting a video to the computer during the broadcast, creating a pseudo-television show out of a radio broadcast. Relatedly, a text-based website can come alive with real-time broadcast radio or television. Game shows can add text, graphics and movies to their programs and still direct the user to its advertiser's websites during commercial breaks.

If the websites are advertiser home pages, the home pages may audit the number of "hits" received. Not only will this information enable the advertiser to confirm the level of activity on its website, but the advertising fees may be based on the number of hits. Just by virtue of the user's computer visiting the home page, an accurate count can be obtained of the number of gross broadcast impressions that were generated by the system technology.

The receiver may also cooperate with the computer to automatically save or access only websites meeting certain profile information. For example, the user may complete a profile indicating certain preferences, such as desire to be automatically entered in all contests, receive all coupon offers for laundry soap or receive all information from a specific automobile advertiser. This profile may be stored in the individual computer 40 so that the program uses the profile to filter out unwanted URL's. Alternatively, the profile may be stored at the central office 70 and a page sent to only to those particular receivers and users which have indicated an interest in receiving the information. For example, central office 70 may store a list of the receivers 30 which want certain information, so that the central office only sends pages to those particular receivers. Although all the receivers 30 might be physically capable of accepting the signal, not all will take the next step and make a connection with the associated on-line service.

The system is flexible enough to encompass a variety of alternatives. For example, the address need not be a URL and the intended on-line service a website. Rather the address and intended on-line service could be a phone number to a BBS, an electronic address to another aspect of the Internet (FTP, Gopher, WAIS, WWW, NewsGroups, Lists) or a phone number to a general information provider such as CompuServe, America Online or the like.

Additionally, the general computer may be any device capable of accessing the Internet and its related services such as an Intel-based (IBM-PC and compatible running under DOS or Windows) or a Motorola-based (Apple Macintosh, Apple PowerMac) personal computer. The computer may also be one of the more powerful workstation class computers (Sun, MIPS, Hewlett Packard) or a mini or main-frame computer (IBM RS/6000, AS/400, System/390, DEC VAX). If modified by appropriate hardware and software to allow access to the Internet, other dedicated computers may also be used such as game machines (Sega Genesis, Nintendo Game Boy) and electronic organizers and pen-based computers (Sharp Wizard, Casio B.O.S.S., Apple Newton, Psion). Additionally, specialized telecommunications devices and multi-function terminals provided for home banking, shopping and access to other information services and the like which are modified to access Internet may also be used.

The transmitter 20 is also not limited to paging networks. For example, the transmitter may *be* a traditional television broadcaster, an AM, FM or HAM radio station, a digital direct satellite, video playback systems such as video cassette recorders/players or laser disc players, audio playback systems such as stereos and compact disc players and all other forms of digital, analog, or hybrid transmission capable of storing or embedding and transmitting alpha-numeric electronic addresses. For example, the URL may be stored in the vertical blanking interval of a television broadcast or sent on the video broadcast's carrier signal much like closed-captioning. Just as closed-captioning is extracted from the signal as an alpha-numeric message, so may the URL be extracted by receiver 30 and provided to the computer. However, in the preferred embodiment of a paging system, the carrier frequency of the broadcasted URL is different than the carrier frequency of the radio or television broadcast. The means of transmission may be by wire, wireless, optical or electromagnetic.

The hardware of the receiver will change with the nature of the transmission and also may include a number of alternatives. For example, the receiver is preferably tunable via software and/or hardware. The receiver is also preferably keyed so that it may receive different classes of pages depending upon the profile of the user. The receiver may be an FM receiver with a UART and asynchronous serial port operating at a baud rate compatible with most computer serial ports.

The subject matter of provisional application no. 60/008,111 is incorporated herein by reference, *the content of which is set forth in the following paragraphs*.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

*Automatic On-Line Access*

*Overview*

*The present invention ("the System") allows broadcasters and intercasters, including: AM & FM radio stations, television stations, cable systems, all other audio and video broadcasters, video playback system such as video cassettes, laser disc players, audio playback systems such as Compact Discs and mini discs and all other forms of digital or analog transmission to transmit alpha-numeric URL (Uniform Resource Locators) and Internet addresses as well as other computer data to a personal computer such as an IBM-PC or compatible, a Mac, Powermac or other computers equipped with the appropriate hardware and software.*

*Computers receiving transmitted addresses and other data can be automatically directed to advertiser or broadcaster specific sites on the World Wide Web, FTP's or other Internet sites in relative synchronicity to the broadcast signal.*

*The System includes both automatic & history stack browse modes and can bring all broadcasters & intercasters into the communication age by broadcasting Internet*

*addresses to participating computers using FM subcarrier signals, television VBI codes or direct connections.*

*For any computer receiving transmitted addresses and other data, the System software can automatically or manually send a request that more information needs to be sent to the subscriber from the advertiser, promoter, broadcaster, or anyone generating the transmitted information sent to the subscriber.*

*An extensive profile request form, which is part of the System software, is created from the offerings of known content providers. This form may be dynamically updated electronically via the Internet or similar bi-directional electronic communication between a central site and the computers using the receivers and software of the inventions.*

*The user can specify the types of information by category or from the specific list of content providers available. For example, a user might want to be automatically entered in all contests, receive all coupon offers for laundry soap, or all information from a specific automobile advertiser.*

*The System may also transmit an automatic or manual request for additional information. This request can be a request for additional information in a variety of mediums including but not limited to: 1) electronic form by having the System software add the user's electronic mail address to a list server for a specific content provider whereby the user would receive periodic information without further action. An example would be the concert schedule of a musical group in a specific geographic area; 2) human form by having the software create an electronic mail message to be directed to a human for follow-up. An example would be an offer to have a salesperson call; 3) hard copy form by having the software create an electronic mail message to be directed to an appropriate party to have printed literature sent via mail or equivalent to the user's address; 4) electronic in the form of an executable program or data file that may contain audio, video, text, binary, or security key information by having the software create an electronic transfer request for the item to be retrieved from the content provider directed location.*

*The invention also has the ability for the user to create an order to purchase the offered product or service based on information provided by the content provider and the known information about the user from the user profile form. The user will enter relevant name, address, and method of payment information, along with appropriate security authorization (i.e., a personal identification code) to initiate and/or finalize the transaction. The authorization code will be required each time to complete the transaction. Transactions processed through the System will provide the user with confirmation and optional cancellation instructions. All transmission of sensitive information may be made secure within the limits of the available technology and relevant National Security export regulations on encryption of data.*

*An Example of How the System Works*

*In one embodiment, the broadcaster transmits an alpha-numeric message containing an AutoURL code over a common broadcast paging network or via FM subcarrier, RF or satellite slightly in advance of the broadcast programming. The computer program to transmit the Internet address is part of the System. If the System uses VBI video encoding, the signal can be synchronously broadcast with the television signals. Other means of broadcasting are also possible.*

*A plurality of receivers in accordance with the invention are attached to computers in the broadcast area: local, regional, nationwide or worldwide.*

*When a receiver receives an AutoURL transmission, the alpha-numeric data (usually a Web URL address) is stored in computer memory and an Internet browser will automatically contact the broadcaster's desired Internet site. This allows a broadcaster to control the internet destination of the receiver's computer. The receiving computer should have access to the Internet, either through a modem and POTS telephone line or by other means. The receiving computer user can either use their own Internet account or sign-on to a service associated with the invention.*

*Uses*

1. *Direct Response Selling—for example: taking users to specific web sites with radio broadcasts.*
2. *Coupon Distribution—for example: making special offer coupons available to users in sync with commercials.*
3. *Game Playing—for example: logging users on to interactive game play sites in sync with broadcasts.*
4. *Advertising—for example: making more complete information available to potential buyers.*
5. *Increasing or Controlling Internet traffic—for example: for example: forcing users to log onto specific servers in response to specific commercials, programs or other broadcasts.*
6. *Adding Text, Graphics, QuickTime Movies and other computer-style information to radio and television broadcasts.—for example: creating a pseudo-television show out of a radio broadcast.*
7. *Linking the Broadcaster to the Internet.—for example: making radio a part of the explosive Internet marketplace.*
8. *Linking the Internet to broadcasters.—for example: making a text-based FTP site come alive with real-time broadcast radio or television.*
9. *Redefining Entertainment Programming—for example: adding Text, Graphics, QuickTime Movies and other computer-style information to existing programming.*
10. *Redefining Game Show Programming—for example: adding Text, Graphics, QuickTime Movies and other computer-style information to existing programming.*
11. *Adding Pictures to Radio Broadcasts—for example: pseudo-television through the relative synchronous performance of audio and World Wide Web (WWW) or Internet-based visuals on a PC.*
12. *Redefining Educational Programming/Polling & Political broadcasting—for example: using the WWW with a database-equipped server, programmers can ask questions and get answers and give results to users in relative sync with the broadcast performances.*
13. *Order Entry/Creation—Ability for user to immediately place an order for the product or service being offered by the content provider with minimal effort. For example, a musical group offering their new CD record album in a special direct offer.*
14. *Hard Copy Literature Request—Ability for user to manually or automatically request information from a class of content providers or a specific content provider. For example, requesting a voter registration form or a brochure on an automobile.*
15. *Demographic Data Collection—With permission of the user, where applicable, detailed profile form information can be collected and summarized for the benefit of content providers. For example, how many people requested a class of information such as ALL automobile Mini-Van advertisers.*
16. *Grass Roots Activism—Organizations that issue "Call to Action" type messages or content can immediately reach users who have shown an interest based on the user profile form and/or the user's specific request—for more information on the organization's needs and activities. (software ability to add a user to an electronic mail mailing list.)*

17. *Active Selling—Users can be directed to an "on-line" chat area to "type and talk" with a live salesperson about the specific offering. Where technology, permits, an Internet Telephone Call can be created between the user and the content provider. (An Internet Telephone Call may require additional hardware although the System may be compatible with the existing available technologies for Internet Telephone Calls.)*

*The Hardware Transmitters*

*In one embodiment, broadcasters need conventional access to a conventional alpha-numeric paging site in their broadcast area. This may be on their own sub-carrier or leased from a commercial paging company in the area. It may also be any RF transmitter or Satellite download station that is compatible.*

*Broadcasters should have a dedicated data link to the pager network.*

*At a predetermined interval, preferably prior to the broadcasting of affiliated on air program material, the broadcaster will transmit a message to the paging system for broadcast over the paging system to compatible receivers.*

*Webpager™ Hardware Receivers*

*In one embodiment, the receiver may be an FM receiver with a UART and asynchronous serial port operating at a baud rate compatible with most computer serial ports. The FM receiver is tunable via software so that numerous broadcasts can be tuned in. The receivers are also software keyed to receive numerous alpha-numeric messages on one or many specific frequencies so that one pager system can transmit for a plurality of broadcasters in a given broadcast area. The receiver downloads the alpha-numeric message to the computer. Technology for implementing a receiver capable of downloading pager information to a computer is well known in the art.*

*Software Receivers*

*In one embodiment, the software loads the address from the receiver and uses the address to connect with a service on the WWW (World Wide Web). The primary software resident in the receiver is a WWW compatible browser, such as Mosaic™ or Netscape™. The software may also be a TSR (Temporary Stay Resident) program which will work in conjunction with Web Browser software packages. The software may have two modes: Automatic & History Stack. These modes will be user setable and self-running.*

*How the Software Works*

*In one embodiment, the System software runs in the background on host computers. It is constantly looking at, for example, a user-selectable COM port for compatible alphanumeric data. When the software sees an Internet address, it stores the address in memory and writes it to a file on the computer's hard drive. If the user is running the software in Auto-mode, the System instructs the Web Browser to go the specific URL. In history-stack mode, the URL is stored along with a brief description of the website.*

*The software also allows the user to interrupt the automatic address system at any time by clicking anywhere in a given Web page. This action automatically switches the software to history stack mode and allows the user to explore a preferred website. The user may switch back to Auto-mode at any time by clicking the appropriate icon.*

*The Home Page*

*In one embodiment, the URL's will preferably start at a home page licensed to the specific advertiser or broadcaster. This allows for concise auditing of "hit" activity from any given transmission.*

*The system can be completely advertiser driven such that fees are charged on a per-hit basis.*

*Other educational and non-profit uses exist for this technology.*

*Miscellaneous*

*This technology might be made available free to consumers who want it. The hardware cost of an individual user site is expected to be relatively inexpensive.*

*Potential corporate uses of the technology include:*

1. *Advertisers*
2. *Web Site Providers*
3. *Software Companies*
4. *Pager Companies*
5. *Phone Companies*
6. *Direct Response and Order/Literature Fulfillment Organizations*
7. *Demographic Data Users*

*An Example of How the Invention may be Used*

*Radio stations are being all but left out of the information revolution. As we enter the communication age, the lines separating telephones, televisions and computers are blurring. However, radio has still been an isolated broadcast source. The invention can be used to bring radio stations into the communication age and provide a brand new method of driving high volume WWW traffic.*

*Radio stations can simply broadcast compatible AutoURL's to compatible personal computers. When the users are running the System software in Auto-mode, they will be automatically logged onto WWW sites that are associated with the specific radio broadcast that they are listening to. If they are running the System in history stack-mode, they will be collecting the URL's of the WWW sites that they have received during the broadcast along with a short description of the website for use in later visits from a saved "hot list."*

*This use by radio stations, which is a primary use of the System described above, allows for synchronously linking radio broadcasts to WWW homepages.*

*The system can be 100% advertiser driven because a radio station sales force can sell "hits" on the web site as part of the advertising package. Anyone who has a website is a potential client. This is true for television advertisers as well.*

*A plurality of web servers with the home pages may be offered which combine radio station call letters and a primary advertising message and which link this homepage to a deeper, advertiser created and operated homepage on a central server or on other servers. Pricing may be either by the number of "hits" an ad generates or by rating an average of "hits" over a given ratings period. There may also be a fiat fee for setup and minimum guarantees for smaller advertisers.*

*Summary of the Invention*

*A method is provided for directing a computer at a first location to communicate with an on-line service located at a second location remote to the first location. The method includes transmitting an address identifying the on-line service from a transmitter at a third location remote from the first and second locations and receiving the address at the computer, whereby the computer automatically accesses the on-line service by using the address.*

*Preferably, the transmitter also transmits audio and/or video information and the on-line service provides information related to the audio and/or video information to the computer while the computer is accessing the on-line service. The information provided by the on-line service may also change in synchronicity with the audio and/or video information.*

*The address may be a Universal Resource Locator of the Internet, and the step of automatically accessing the on-line service comprises the computer sending the address via telephone lines to connect with the on-line service. The on-line service at the address may also send information back to the computer via the telephone lines.*

*The address may identify a portion of the information available from the online service, and the step of connecting the computer to the on-line service may occur before the step of receiving.*

*Preferably, the method includes tracking the amount of times the computer accesses the on-line service and calculates a fee related to the amount of times.*

*The transmitter may comprise any number of means, such as a pager network, a television or radio broadcast transmitter, or a video cassette or laser disk player.*

*Another embodiment of the invention includes a method of directing computers located at a plurality of different first locations to communicate with an on-line service, the on-line service being located at a second location remote from the first locations. This method includes transmitting an address from a transmitter at a third location to the plurality of the computers. The third location is remote from the first and second locations and the address identifies the on-line service.*

*The method also includes simultaneously receiving the address at the plurality of computers whereby at least one of the computers uses the address to access the online service.*

*Preferably, the step of transmitting includes transmitting the address by modulating an electromagnetic wave which has a carrier frequency associated with television and radio signals. Audio and/or video information may also be transmitted at the same carrier frequency. The step of transmitting the audio and/or video information preferably occurs while the on-line service is providing information related to the audio and/or video information to the computer.*

*Alternatively, the method includes the steps of a station transmitting audio and/or video information at a different frequency than the address, and the on line service providing information related to the audio and/or video information. The audio and/or video information may be provided to the computer before, during or after the step of accessing.*

*The method may also comprise the step of sending response information from the computer to the on-line service after the step of accessing. The response information may then be sent from the on-line service to the transmitter or station and any audio and/or video information modified in response to the response information.*

*The method preferably includes repeating the steps of transmitting and receiving with different addresses identifying different on-line services, and storing a plurality of the different addresses in the computer before the step of accessing.*

*Yet another embodiment of the invention includes a system for directing a computer located at a first location to access an on-line service. The system comprises an on-line service located at a second location remote to the first location and a transmitter located at a third location remote to the first and second locations and for transmitting an address identifying the on-line service. The computer receives the address and automatically accesses the on-line service by using the address.*

*Desirably, the computer includes a receiver for receiving the addresses which are transmitted via electromagnetic waves. The waves may be frequency modulated radio waves.*

*The computer preferably includes a modem for accessing the on-line service.*

*Yet a further embodiment of the invention is a method of directing a computer at a first location to communicate with a first on-line service identified by a first address and a second on-line service identified by a second address, each online service being located at a location remote from the first location. The method comprises transmitting the first address from a first transmitter located remotely from the computer and the on-line services, receiving the first address at the computer, transmitting the second address from a second transmitter located remotely from the computer and the on-line services, and receiving the second address at the computer, whereby the computer automatically accesses the first online service by using the first address and automatically accesses the second on-line service by using the second address. The first transmitter and second transmitter may be the same transmitter.*

*Yet another embodiment of the present invention comprises a method of directing a computer to access information related to a radio or television broadcast. The method includes transmitting an address identifying an on line service from a pager network and receiving the address at the computer. The computer then automatically accesses the on-line service by using the address, and receives information related to the radio or television broadcast. Preferably, the address is transmitted from the pager network shortly before or after the radio or television broadcast.*

*As used herein, the term "remote", in addition to its ordinary meaning, also means being separated by a distance which may be of any length. Yet, further, in all of the above embodiments, the transmitter and on-line service may be at the same location.*

*Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.*

What is claimed is:

[1. A method for connecting a computer with one or more on-line services providing information corresponding to audio or video programming being broadcasted comprising:

a) providing a computer located at a first location and an on-line service located at a second location remote to said first location, b) broadcasting from a programming transmitter audio or video programming to one or more audio or video receivers, c) receiving an address identifying said on-line service at an address transmitter from said programming transmitter or from a central office, d) transmitting said address identifying said on-line service from said address transmitter at a third location remote from said first and second locations, said on-line service providing information corresponding with the audio or video programming being broadcast from said programming transmitter at the time said address is transmitted, e) coordinating said step of transmitting to occur simultaneously with said step of broadcasting, independent of user interaction with said on-line service, f) receiving said transmitted address at said computer, and g) automatically accessing said on-line service by said computer using said address identifying said on-line service.]

2. The method of claim [1] *17* wherein said address is a Universal Resource Locator and said [on-line] *data* service is a website.

3. The method of claim 2 wherein said [on-line] *data* service further comprises an Internet Service Provider providing access to said website.

4. The method of claim 2 wherein said [on-line] *data* service at said address sends information to said *at least one of said plurality of* computer*s*.

5. The method of claim 4 wherein said [step of automatically accessing said on-line service] *transmitting said address* comprises sending said address via telephone lines to connect with said [on-line] *data* service.

6. The method of claim 5 wherein said [step of accessing] *directing* comprises connecting said *at least one of said plurality of* computer*s* to said [on-line] *data* service via a modem connected to [said] *at least one of said plurality of* computer*s*.

[7. The method of claim 1 wherein said address identifies a portion of the information contained in said on-line service, and wherein said step of connecting said computer to said on-line service occurs before said step of receiving.]

8. The method of claim [1] *17* further comprising determining the [amount] *number* of times said *at least one of said plurality of* computer*s* accesses said [on-line] *data* service.

9. The method of claim [1] *17* wherein said transmission of *said* address[es] occurs via electromagnetic waves.

10. The method of claim 9 wherein said address transmitter is a paging system.

11. The method of claim 9 wherein said address transmitter further transmits [television or radio signals] *audio or video programming*.

12. The method of claim [1] *17* wherein said address transmitter is *included in* an audio or video playback device.

[13. The method of claim 1 wherein said address transmitter is a website and said step of transmitting comprises sending said address to said computer via the Internet.]

[14. The method of claim 1 wherein said step of receiving said address occurs in relative synchronicity and in real-time with the step of broadcasting said audio or video programming.]

[15. The method of claim 14 wherein said step of receiving said address occurs simultaneously with said step of broadcasting said audio or video programming.]

[16. The method of claim 1 wherein said step of receiving said address includes receiving a predetermined schedule of programming of said audio or video programming.]

17. A method [of] *for* automatically directing computers [located at a plurality of different first locations] to communicate with [an on-line] *a data* service providing information corresponding to audio or video programming being broadcasted, [said on-line service being located at a second location remote from said first locations,] comprising:

a) receiving an address identifying said [on-line] *data* service at an address transmitter [from a programming transmitter or from a central office], b) transmitting said address from said address transmitter [at a third location independent of said on-line service] to [said] *a* plurality of [said] computers, [said third location being remote from said first and second locations and said address identifying said on-line service,] *whereby said transmitted address is received substantially simultaneously at said plurality of computers,* c) broadcasting from [said] *a* programming transmitter audio or video information corresponding with said [on-line] *data* service, *wherein the address identifying said data service is separate from the audio or video information being broadcast,* d) coordinating said [step of] transmitting to occur *substantially* simultaneously with said [step of] broadcasting, independent of user interaction with said [on-line] *data* service, *and* e) [simultaneously receiving said transmitted address at said plurality of computers, and f)] automatically *directing at least one of said plurality of computers to* access[ing] said [on-line] *data* service [by at least some of said plurality of computers] using said address identifying said [on-line] *data* service, *said at least one of said plurality of computers being operable to retrieve and display the information provided by the data service specified by the transmitted address*.

18. The method of claim 17 wherein said step of transmitting includes transmitting said address by modulating an electromagnetic wave which has a carrier frequency associated with a television [or radio] signal.

19. The method of claim 18 wherein said audio or video information is broadcast at said [same] carrier frequency.

20. The method of claim 17 wherein said [steps of] transmitting includes transmitting said address by modulating an electromagnetic wave which has a first carrier frequency, and [further comprising the step of transmitting audio and/or video information] *wherein said broadcasting is* at a second carrier frequency different than said first carrier frequency.

[21. The method of claims 18 or 20 wherein said audio or video information is provided to said computer before said step of accessing.]

[22. The method of claims 18 or 20 wherein said audio or video information is provided to said computer during said step of accessing.]

[23. The method of claims 18 or 20 wherein said audio or video information is provided to said computer after said step of accessing.]

24. The method of claim 17 wherein said [step of receiving] *at least one of said plurality of computers receives* said address [occurs] in relative synchronicity and in real-time with [the step of] *said* broadcasting [said audio or video programming].

[25. The method of claim 24 wherein said step of receiving said address occurs simultaneously with said step of broadcasting said audio or video programming.]

26. The method of claim 17 wherein said [step of receiving includes receiving] *at least one of said plurality of computers receives* a predetermined schedule of programming of said audio or video programming.

[27. A method of automatically directing computers located at a plurality of different first locations to communicate with an on-line service providing information corresponding to audio or video programming being broadcasted, said on-line service being located at a second location remote from said first locations, comprising:

a) receiving an address identifying said on-line service at an address transmitter from a programming transmitter or from a central office, b) transmitting said address from said address transmitter at a third location to said plurality of said computers, said third location being remote from said first and second locations and said address identifying the on-line location of said on-line service, c) simultaneously receiving said transmitted address at said plurality of computers, d) broadcasting from said programming transmitter audio or video information corresponding with said on-line service, c) coordinating said step of transmitting to occur simultaneously with said step of broadcasting, independent of user interaction with said on-line service, f) at least one of said computers using said address to automatically access said on-line service, and g) sending response information from said computer to said on-line service after said computer accesses said on-line service.]

[28. The method of claim 27 further comprising modifying said audio or video information in response to said response information.]

29. The method of claim [27] *17* further comprising repeating said [steps of] transmitting [and receiving by] using different addresses identifying different [on-line] *data* services, and storing a plurality of said different addresses in said *at least one of said plurality of* computers [before said step of accessing].

[30. The method of claim 27 wherein said step of receiving said address occurs in relative synchronicity and in real-time with the step of broadcasting of said audio or video programming.]

[31. The method of claim 30 wherein said step of receiving said address occurs simultaneously with said step of broadcasting said audio or video programming.]

[32. The method of claim 27 wherein said step of receiving includes receiving a predetermined schedule of programming of said audio or video programming.]

[33. A method of directing a computer at a first location to automatically communicate with a first on-line service identified by a first address and with a plurality of subsequent on-line services identified by subsequent addresses, said first and subsequent addresses providing information corresponding to audio or video programming being broadcasted, each on-line service being located at a location remote from said first location, said method comprising:

a) receiving said first and subsequent addresses identifying said on-line services at an address transmitter from a programming transmitter or from a central office, b) transmitting said first address from said address transmitter located remotely from said computer and said on-line services, c) broadcasting from said programming transmitter first audio or video programming corresponding with said first on-line service, d) coordinating with step of transmitting said first address to one or more audio or video receivers to occur simultaneously with said step of broadcasting first audio or video programming, independent of user interaction with said on-line service, e) receiving said first address at said computer, f) transmitting said subsequent addresses from said address transmitter, g) broadcasting from said programming transmitter second audio or video programming corresponding with said plurality of subsequent on-line services, h) coordinating said step of transmitting said subsequent addresses to occur simultaneously with said step of broadcasting second audio or video programming, i) receiving said subsequent addresses at said computer, and j) said computer automatically accessing said first on-line service by using said first address and automatically and continually accessing said plurality of on-line services by using said subsequent addresses.]

34. A method [of] *for* directing a computer to automatically access information related to audio or video programming [simultaneously with the audio or video programming being] broadcast from one or more programming transmitters comprising:

a) receiving an address identifying [said on-line] *a data* service at an address transmitter [from said programming transmitters or from a central office], b) transmitting said address identifying said [on-line location of said on-line] *data* service from [a paging system] *the address transmitter, whereby said address is received at said computer, wherein the address identifying said data service is separate from the audio or video programming being broadcast,* c) coordinating said [step of] transmitting to occur *substantially* simultaneously with the broadcasting of the audio or video programming, *and* d) [receiving said address at said computer,] *directing said computer to* automatically access[ing] *information related to said audio or video programming from* said [on-line] *data* service [by said computer] using said address*, said computer being operable to retrieve and display the information from said data service specified by the address*[, and e) receiving information related to said radio or television programming at said computer].

35. A system for automatically connecting a computer with multiple [on-line] *data* services providing information corresponding to audio or video programming being [broadcasted] *transmitted* comprising:

a) an audio or video programming [broadcaster] *transmitter*, b) an address transmitter for receiving [an] address*es* identifying said [on-line] *data* services from a programming transmitter [of from a central office] and for transmitting [on-line locations] *said addresses* of said [on-line] *data* services, *wherein the addresses identifying said data services are separate from the audio or video programming being transmitted,* c) a computer connectable to multiple [on-line] *data* service*s*, *wherein said computer is operable to retrieve and display information provided by the data services specified by the addresses,* and d) a receiver connectable to said computer for receiving transmissions of different addresses from said address transmitter via a communications channel identifying said [on-line locations] *addresses* of said [on-line] *data* services, said address transmitter sending said addresses *substantially* simultaneously with the *audio or video* programming being [broadcast by said broadcaster] *transmitted* and said [on-line] *data* services contain*ing* information corresponding with said programming.

36. The system as claimed in claim 35 wherein said address transmitter comprises a paging system.

37. The system as claimed in claim 35 wherein said address transmitter comprises a web site.

38. The system as claimed in claim 37 wherein said communications channel is the Internet.

*39. A method for automatically directing a plurality of computers located at a plurality of different first locations to communicate with a web site and display content of the web site, said web site being located at a second location remote from said first locations, comprising:*

*receiving an Internet address identifying the web site at an address transmitter located at a third location remote from said first and second locations;*

*transmitting the Internet address from the address transmitter to said plurality of computers, whereby said Internet address is received at said plurality of computers substantially simultaneously;*

*broadcasting audio or video information corresponding to said web site substantially simultaneously with the transmitting, independent of user interaction with the web site, wherein the Internet address identifying the web site is separate from the audio or video information being broadcasted;*

*automatically directing at least one of said plurality of computers to communicate with said web site using said Internet address identifying said web site, said at least one of said plurality of computers operable to retrieve the content of said web site; and*

*causing the display of content from said web site on a display operably connected to said at least one of said plurality of computers.*

*40. A system for receiving video programming content and an address identifying a data service, wherein the address identifying the data service is received at an address transmitter, and wherein the data service provides information associated with the video programming content, comprising:*

*a television receiver, operable to receive the video programming content which is broadcast;*

*a display connected to the television receiver, the display operable to display the video programming content;*

*a computer operable to receive the address identifying the data service from the address transmitter which transmits the address, wherein the transmitting of the address is coordinated to occur substantially simultaneously with the broadcasting of the video programming content, independent of user interaction with the data service, wherein the address is separate from the video programming content, wherein the computer automatically connects to the data service associated with the video programming content using the address identifying the data service, the computer being operable to retrieve and cause the display of information provided by the data service specified by the address.*

*41. A method for receiving video programming content and an address identifying a data service associated with the video programming content, and for connecting to the data service, wherein the address identifying the data service is received at an address transmitter, the method comprising:*

*receiving the video programming content, which is broadcast, at a television receiver;*

*displaying the video programming content on a television display;*

*receiving the address, which is transmitted from the address transmitter, at a computer, wherein the address is separate from the video programming content, wherein the transmitting of the address is coordinated to occur substantially simultaneously with the broadcasting of the video programming content, independent of user interaction with the data service;*

*automatically connecting to the data service associated with the video programming content using the address identifying the data service; and*

*retrieving information provided by the data service at the computer, the computer being operable to cause the display of the information provided by the data service specified by the address.*

*42. The system of claim 35 wherein the data service comprises an on-line service.*

*43. The method of claim 17 wherein the data service comprises an on-line service.*

*44. The method of claim 34 wherein said address transmitter comprises a paging system.*

*45. The method of claim 34 wherein the data service comprises an on-line service.*

*46. The method of claim 34, wherein said address is a Universal Resource Locator and said data service is a website.*

*47. The method of claim 46, wherein said data service further comprises an Internet Service Provider providing access to said website.*

*48. The system of claim 35, wherein said computer is automatically directed to access information related to said audio or video programming from said data service using said addresses.*

*49. The system of claim 35, wherein said address is a Universal Resource Locator and said data service is a website.*

*50. The system of claim 49, wherein said data service further comprises an Internet Service Provider providing access to said website.*

*51. The system of claim 35, wherein said audio or video programming transmitter is a broadcaster.*

*52. A system for receiving video programming content and an address identifying a data service, wherein the address identifying the data service is received at an address transmitter, and wherein the data service provides information associated with the video programming content, comprising:*

*a receiver, operable to receive the video programming content which is broadcast;*

*the receiver also being operable to cause a display of the video programming content;*

*a computer operable to receive the address identifying the data service from the address transmitter which transmits the address, wherein the transmitting of the address is coordinated to occur substantially simultaneously with the broadcasting of the video programming content, independent of user interaction with the data service, wherein the address is separate from the video programming content, wherein the computer automatically connects to the data service associated with the video programming content using the address identifying the data service; and wherein the computer is operable to retrieve and cause a display of the information provided by the data service specified by the address.*

*53. A method for receiving video programming content and an address identifying a data service associated with the video programming content, and for connecting to the data service, wherein the address identifying the data service is received at an address transmitter, the method comprising:*

*receiving the video programming content, which is broadcast, at a receiver;*

*causing a display of the video programming content on a display;*

*receiving the address, which is transmitted from the address transmitter, at a computer, wherein the address is separate from the video programming content, wherein the transmitting of the address is coordinated to occur substantially simultaneously with the broadcasting of the video programming content, independent of user interaction with the data service;*

*automatically connecting to the data service associated with the video programming content using the address identifying the data service; and*

*retrieving information provided by the data service at the computer, wherein the computer is operable to cause a display of the information provided by the data service.*

*54. The method of claim 17, wherein said address identifying said data service is embedded in a broadcast signal separate from said audio or video programming in said broadcast signal.*

*55. The method of claim 54, wherein said address identifying said data service is embedded in a vertical blanking interval.*

*56. The method of claim 34, wherein said address identifying said data service is embedded in a broadcast signal separate from said audio or video programming in said broadcast signal.*

*57. The method of claim 56, wherein said address identifying said data service is embedded in a vertical blanking interval.*

*58. The system of claim 35, wherein said addresses identifying said data services are embedded in broadcast signals separate from said audio or video programming in said broadcast signals.*

*59. The system of claim 58, wherein said addresses identifying said data services are embedded in a vertical blanking interval.*

*60. The method of claim 39, wherein said Internet address is embedded in a broadcast signal separate from said audio or video information in said broadcast signal.*

*61. The method of claim 60, wherein said address identifying said data service is embedded in a vertical blanking interval.*

*62. The system of claim 40, wherein said address identifying said data service is embedded in a broadcast signal separate from said video programming content in said broadcast signal.*

*63. The system of claim 62, wherein said address identifying said data service is embedded in a vertical blanking interval.*

*64. The method of claim 41, wherein said address identifying said data service is embedded in a broadcast signal separate from said video programming content in said broadcast signal.*

*65. The method of claim 64, wherein said address identifying said data service is embedded in a vertical blanking interval.*

*66. The method of claim 52, wherein said address identifying said data service is embedded in a broadcast signal separate from said video programming content in said broadcast signal.*

*67. The method of claim 66, wherein said address identifying said data service is embedded in a vertical blanking interval.*

*68. The method of claim 53, wherein said address identifying said data service is embedded in a broadcast signal separate from said video programming content in said broadcast signal.*

*69. The method of claim 68, wherein said address identifying said data service is embedded in a vertical blanking interval.*

* * * * *